US012795573B2

(12) United States Patent
Yuan et al.

(10) Patent No.: US 12,795,573 B2
(45) Date of Patent: Nov. 10, 2026

(54) TIMING ADVANCE APPLICATION WITH MULTIPLE TRANSMIT RECEIVE POINTS

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 18/710,807

(22) PCT Filed: Jan. 28, 2022

(86) PCT No.: PCT/CN2022/074552
§ 371 (c)(1),
(2) Date: May 16, 2024

(87) PCT Pub. No.: WO2023/141931
PCT Pub. Date: Aug. 3, 2023

(65) Prior Publication Data
US 2025/0039810 A1 Jan. 30, 2025

(51) Int. Cl.
*H04W 56/00* (2009.01)
*H04W 72/044* (2023.01)

(52) U.S. Cl.
CPC ..... *H04W 56/0045* (2013.01); *H04W 72/044* (2013.01)

(58) Field of Classification Search
None
See application file for complete search history.

(56) References Cited

U.S. PATENT DOCUMENTS 10,917,205 B2 * 2/2021 Kim .................. H04W 56/0005
11,496,979 B2 * 11/2022 Turtinen ............... H04W 80/02
(Continued)

FOREIGN PATENT DOCUMENTS

| | | | |
|---|---|---|---|
| CN | 113261331 | * | 8/2021 |
| EP | 3297343 | A2 | 3/2018 |
| WO | WO-2019168826 | A1 | 9/2019 |

OTHER PUBLICATIONS

International Search Report and Written Opinion—PCT/CN2022/074552—ISA/EPO—Jun. 1, 2022.
(Continued)

*Primary Examiner* — Andre Tacdiran
(74) *Attorney, Agent, or Firm* — Harrity & Harrity, LLP

(57) ABSTRACT

Various aspects of the present disclosure generally relate to wireless communication. In some aspects, a mobile station may select a subcarrier spacing (SCS), according to a largest SCS rule or a minimum SCS rule, from among SCSs for active uplink bandwidth parts (BWPs) for a component carrier (CC) that is enabled for multiple transmit receive points, based at least in part on at least two timing advance groups (TAGs) being configured for the CC and each TAG of the at least two TAGs being associated with multiple active uplink BWPs of multiple CCs. The mobile station may transmit a communication after applying a TA command value that is indicated by a TA command associated with the SCS. The mobile station may apply the TA value after a TA application time that is based at least in part on the SCS. Numerous other aspects are described.

16 Claims, 14 Drawing Sheets

(56) References Cited

U.S. PATENT DOCUMENTS

| | | | |
|---|---|---|---|
| 2015/0036666 A1 | 2/2015 | Blankenship et al. | |
| 2019/0313407 A1 | 10/2019 | Tsai | |
| 2020/0235871 A1 | 7/2020 | Kim et al. | |
| 2020/0275398 A1 | 8/2020 | Da et al. | |
| 2020/0337011 A1 | 10/2020 | Jiang et al. | |
| 2021/0105732 A1 | 4/2021 | Takeda et al. | |
| 2021/0266855 A1 | 8/2021 | Akkarakaran et al. | |
| 2022/0053442 A1* | 2/2022 | Luo | H04W 56/0045 |
| 2022/0150860 A1* | 5/2022 | Liu | H04W 80/02 |

OTHER PUBLICATIONS

Supplementary European Search Report—EP22922776—Search Authority—The Hague—Oct. 22, 2025.

Supplementary Partial European Search Report—EP22922776—Search Authority—The Hague—Aug. 8, 2025.

* cited by examiner

TIMING ADVANCE APPLICATION WITH MULTIPLE TRANSMIT RECEIVE POINTS

CROSS-REFERENCE TO RELATED APPLICATION

This Patent Application is a 371 national stage of PCT Application No. PCT/CN2022/074552 filed on Jan. 28, 2022, entitled "TIMING ADVANCE APPLICATION WITH MULTIPLE TRANSMIT RECEIVE POINTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for applying a timing advance with multiple transmit receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include selecting, by the mobile station, a subcarrier spacing (SCS), according to a largest SCS rule, from among SCSs for active uplink bandwidth parts (BWPs) for a component carrier (CC) that is enabled for multiple transmit receive points (TRPs), based at least in part on at least two timing advance groups (TAGs) being configured for the CC and each TAG of the at least two TAGs being associated with multiple active uplink BWPs of multiple CCs. The method may include transmitting, by the mobile station, a communication after applying a TA value that is indicated by a TA command associated with the SCS.

Some aspects described herein relate to a method of wireless communication performed by a network entity. The method may include selecting, by the network entity, an SCS, according to a largest SCS rule, from among SCSs for active uplink BWPs for a CC, configured for a mobile station, that is enabled for multiple TRPs, based at least in part on at least two TAGs being configured for the CC and each TAG of the at least two TAGs being associated with multiple active uplink BWPs of multiple CCs. The method may include receiving, by the network entity, a communication after accounting for a TA value, applied by the mobile station, that is indicated by a TA command associated with the SCS.

Some aspects described herein relate to a method of wireless communication performed by a mobile station. The method may include selecting, by the mobile station, an SCS, according to a minimum SCS rule, from among SCSs for active uplink BWPs for a CC that is enabled for multiple TRPs, based at least in part on at least two TAGs being configured for the CC, each TAG of the at least two TAGs being associated with multiple active uplink BWPs of multiple CCs, and a communication to be transmitted. The method may include transmitting, by the mobile station, the communication after applying a TA value after a TA application time that is based at least in part on the SCS.

Some aspects described herein relate to a method of wireless communication performed by a network entity. The method may include selecting, by the network entity, an SCS, according to a minimum SCS rule, from among SCSs for active uplink BWPs for a CC, configured for a mobile station, that is enabled for multiple TRPs, based at least in part on at least two TAGs being configured for the CC, each TAG of the at least two TAGs being associated with multiple active uplink BWPs of multiple CCs. The method may include receiving, by the network entity, a communication after accounting for a TA value applied by the mobile station after a TA application time that is based at least in part on the SCS.

Some aspects described herein relate to a mobile station for wireless communication. The mobile station may include a memory and one or more processors coupled to the memory. The one or more processors may be configured to, based at least in part on information stored in the memory, select an SCS, according to a largest SCS rule, from among SCSs for active uplink BWPs for a CC that is enabled for multiple TRPs, based at least in part on at least two TAGs being configured for the CC and each TAG of the at least two TAGs being associated with multiple active uplink BWPs of multiple CCs. The one or more processors may be configured to, based at least in part on the information stored in the memory, transmit a communication after applying a TA value that is indicated by a TA command associated with the SCS.

Some aspects described herein relate to a network entity for wireless communication. The network entity may include a memory and one or more processors coupled to the memory. The one or more processors may be configured to, based at least in part on information stored in the memory, select an SCS, according to a largest SCS rule, from among SCSs for active uplink BWPs for a CC, configured for a mobile station, that is enabled for multiple TRPs, based at least in part on at least two TAGs being configured for the CC and each TAG of the at least two TAGs being associated with multiple active uplink BWPs of multiple CCs. The one or more processors may be configured to, based at least in part on the information stored in the memory, receive a communication after accounting for a TA value, applied by the mobile station, that is indicated by a TA command associated with the SCS.

Some aspects described herein relate to a mobile station for wireless communication. The mobile station may include a memory and one or more processors coupled to the memory. The one or more processors may be configured to, based at least in part on information stored in the memory, select an SCS, according to a minimum SCS rule, from among SCSs for active uplink BWPs for a CC that is enabled for multiple TRPs, based at least in part on at least two TAGs being configured for the CC, each TAG of the at least two TAGs being associated with multiple active uplink BWPs of multiple CCs, and a communication to be transmitted. The one or more processors may be configured to, based at least in part on the information stored in the memory, transmit the communication after applying a TA value after a TA application time that is based at least in part on the SCS.

Some aspects described herein relate to a network entity for wireless communication. The network entity may include a memory and one or more processors coupled to the memory. The one or more processors may be configured to, based at least in part on information stored in the memory, select an SCS, according to a minimum SCS rule, from among SCSs for active uplink BWPs for a CC, configured for a mobile station, that is enabled for multiple TRPs, based at least in part on at least two TAGs being configured for the CC, and each TAG of the at least two TAGs being associated with multiple active uplink BWPs of multiple CCs. The one or more processors may be configured to, based at least in part on the information stored in the memory, receive a communication after accounting for a TA value applied by the mobile station after a TA application time that is based at least in part on the SCS.

Some aspects described herein relate to a non-transitory computer-readable medium that stores a set of instructions for wireless communication by a mobile station. The set of instructions, when executed by one or more processors of the mobile station, may cause the mobile station to select an SCS, according to a largest SCS rule, from among SCSs for active uplink BWPs for a CC that is enabled for multiple TRPs, based at least in part on at least two TAGs being configured for the CC and each TAG of the at least two TAGs being associated with multiple active uplink BWPs of multiple CCs. The set of instructions, when executed by one or more processors of the mobile station, may cause the mobile station to transmit a communication after applying a TA value that is indicated by a TA command associated with the SCS.

Some aspects described herein relate to a non-transitory computer-readable medium that stores a set of instructions for wireless communication by a network entity. The set of instructions, when executed by one or more processors of the network entity, may cause the network entity to select an SCS, according to a largest SCS rule, from among SCSs for active uplink BWPs for a CC, configured for a mobile station, that is enabled for multiple TRPs, based at least in part on at least two TAGs being configured for the CC and each TAG of the at least two TAGs being associated with multiple active uplink BWPs of multiple CCs. The set of instructions, when executed by one or more processors of the network entity, may cause the network entity to receive a communication after accounting for a TA value, applied by the mobile station, that is indicated by a TA command associated with the SCS.

Some aspects described herein relate to a non-transitory computer-readable medium that stores a set of instructions for wireless communication by a mobile station. The set of instructions, when executed by one or more processors of the mobile station, may cause the mobile station to select an SCS, according to a minimum SCS rule, from among SCSs for active uplink BWPs for a CC that is enabled for multiple TRPs, based at least in part on at least two TAGs being configured for the CC, each TAG of the at least two TAGs being associated with multiple active uplink BWPs of multiple CCs, and a communication to be transmitted. The set of instructions, when executed by one or more processors of the mobile station, may cause the mobile station to transmit the communication after applying a TA value after a TA application time that is based at least in part on the SCS.

Some aspects described herein relate to a non-transitory computer-readable medium that stores a set of instructions for wireless communication by a network entity. The set of instructions, when executed by one or more processors of the network entity, may cause the network entity to select an SCS, according to a minimum SCS rule, from among SCSs for active uplink BWPs for a CC, configured for a mobile station, that is enabled for multiple TRPs, based at least in part on at least two TAGs being configured for the CC, each TAG of the at least two TAGs being associated with multiple active uplink BWPs of multiple CCs. The set of instructions, when executed by one or more processors of the network entity, may cause the network entity to receive a communication after accounting for a TA value applied by the mobile station after a TA application time that is based at least in part on the SCS.

Some aspects described herein relate to an apparatus for wireless communication. The apparatus may include means for selecting an SCS, according to a largest SCS rule, from among SCSs for active uplink BWPs for a CC that is enabled for multiple TRPs, based at least in part on at least two TAGs being configured for the CC and each TAG of the at least two TAGs being associated with multiple active uplink BWPs of multiple CCs. The apparatus may include means for transmitting a communication after applying a TA value that is indicated by a TA command associated with the SCS.

Some aspects described herein relate to an apparatus for wireless communication. The apparatus may include means for selecting an SCS, according to a largest SCS rule, from among SCSs for active uplink BWPs for a CC, configured for another apparatus, that is enabled for multiple TRPs, based at least in part on at least two TAGs being configured for the CC and each TAG of the at least two TAGs being associated with multiple active uplink BWPs of multiple CCs. The apparatus may include means for receiving a communication after accounting for a TA command value, applied by the other apparatus, that is indicated by a TA command associated with the SCS.

Some aspects described herein relate to an apparatus for wireless communication. The apparatus may include means for selecting an SCS, according to a minimum SCS rule, from among SCSs for active uplink BWPs for a CC that is enabled for multiple TRPs, based at least in part on at least two TAGs being configured for the CC, each TAG of the at least two TAGs being associated with multiple active uplink BWPs of multiple CCs, and a communication to be transmitted. The apparatus may include means for transmitting the communication after applying a TA value after a TA application time that is based at least in part on the SCS.

Some aspects described herein relate to an apparatus for wireless communication. The apparatus may include means for selecting an SCS, according to a minimum SCS rule, from among SCSs for active uplink BWPs for a CC, configured for another apparatus, that is enabled for multiple TRPs, based at least in part on at least two TAGs being configured for the CC, each TAG of the at least two TAGs being associated with multiple active uplink BWPs of multiple CCs. The apparatus may include means for receiving a communication after accounting for a TA value applied by the other apparatus after a TA application time that is based at least in part on the SCS.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
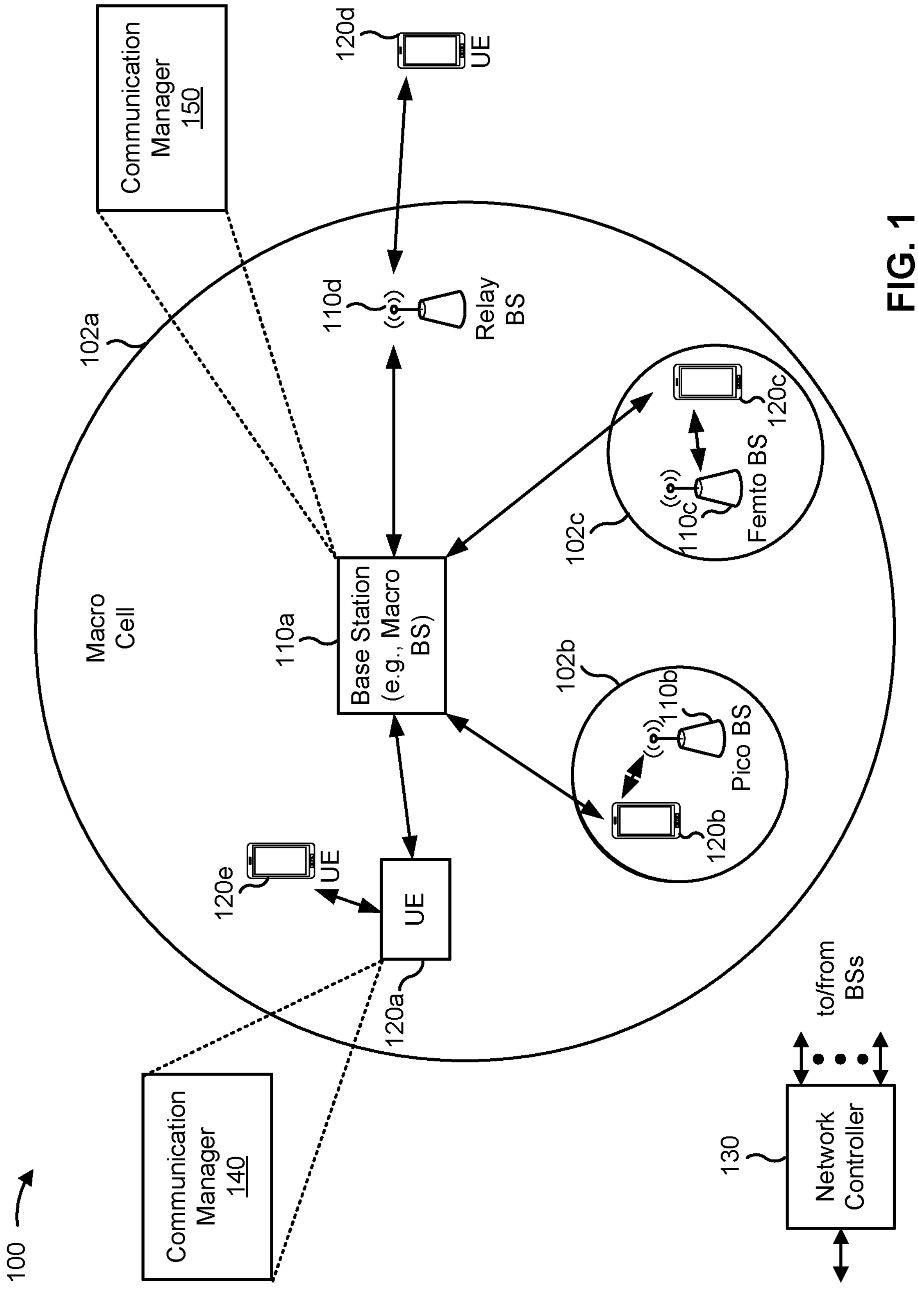
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120*a*, a UE 120*b*, a UE 120*c*, a UE 120*d*, and a UE 120*e*). The wireless network 100 may also include one or more network entities, such as base stations 110 (shown as a BS 110*a*, a BS 110*b*, a BS 110*c*, and a BS 110*d*), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a mobile station (e.g., a UE 120) may include a communication manager 140. As described in more detail elsewhere herein, the communication manager 140 may select a subcarrier spacing (SCS), according to a largest SCS rule, from among SCSs for active uplink bandwidth parts (BWPs) for a component carrier (CC) that is enabled for multiple TRPs, based at least in part on at least two timing advance groups (TAGs) being configured for the CC and each TAG of the at least two TAGs being associated with multiple active uplink BWPs of multiple CCs. The communication manager 140 may transmit a communication after applying a TA value that is indicated by a TA command associated with the SCS.

In some aspects, the network entity may include a communication manager 150. As described in more detail elsewhere herein, the communication manager 150 may select an SCS, according to a largest SCS rule, from among SCSs for active uplink BWPs for a CC, configured for a mobile station, that is enabled for multiple TRPs, based at least in part on at least two TAGs being configured for the CC and each TAG of the at least two TAGs being associated with multiple active uplink BWPs of multiple CCs. The communication manager 150 may receive a communication after accounting for a TA value, applied by the mobile station, that is indicated by a TA command associated with the SCS.

In some aspects, the communication manager 140 may select an SCS, according to a minimum SCS rule, from among SCSs for active uplink BWPs for a CC that is enabled for multiple TRPs, based at least in part on at least two TAGs being configured for the CC, each TAG of the at least two TAGs being associated with multiple active uplink BWPs of multiple CCs. The communication manager 140 may select the SCS further based at least in part on a communication to be transmitted being other than uplink data scheduled by a random access response (RAR) uplink grant or feedback information for a successful RAR. The communication manager 140 may transmit the communication after applying a TA value after a TA application time that is based at least in part on a time granularity associated with or determined from the SCS. Additionally, or alternatively, the communication manager 140 may perform one or more other operations described herein.

In some aspects, the communication manager 150 may select an SCS, according to a minimum SCS rule, from among SCSs for active uplink BWPs for a CC, configured for a mobile station, that is enabled for multiple TRPs, based at least in part on at least two TAGS being configured for the CC, each TAG of the at least two TAGs being associated with multiple active uplink BWPs of multiple CCs. The communication manager 150 may select the SCS further based at least in part on a communication to be transmitted being other than uplink data scheduled by an RAR uplink grant or feedback information for a successful RAR. The communication manager 150 may receive the communication after accounting for a TA value applied by the mobile station after a TA application time that is based at least in part on a time granularity associated with or determined from the SCS. Additionally, or alternatively, the communication manager 150 may perform one or more other operations described herein.

As indicated above, FIG. 1 is provided as an example. Other examples may differ from what is described with regard to FIG. 1.

Figure 2:
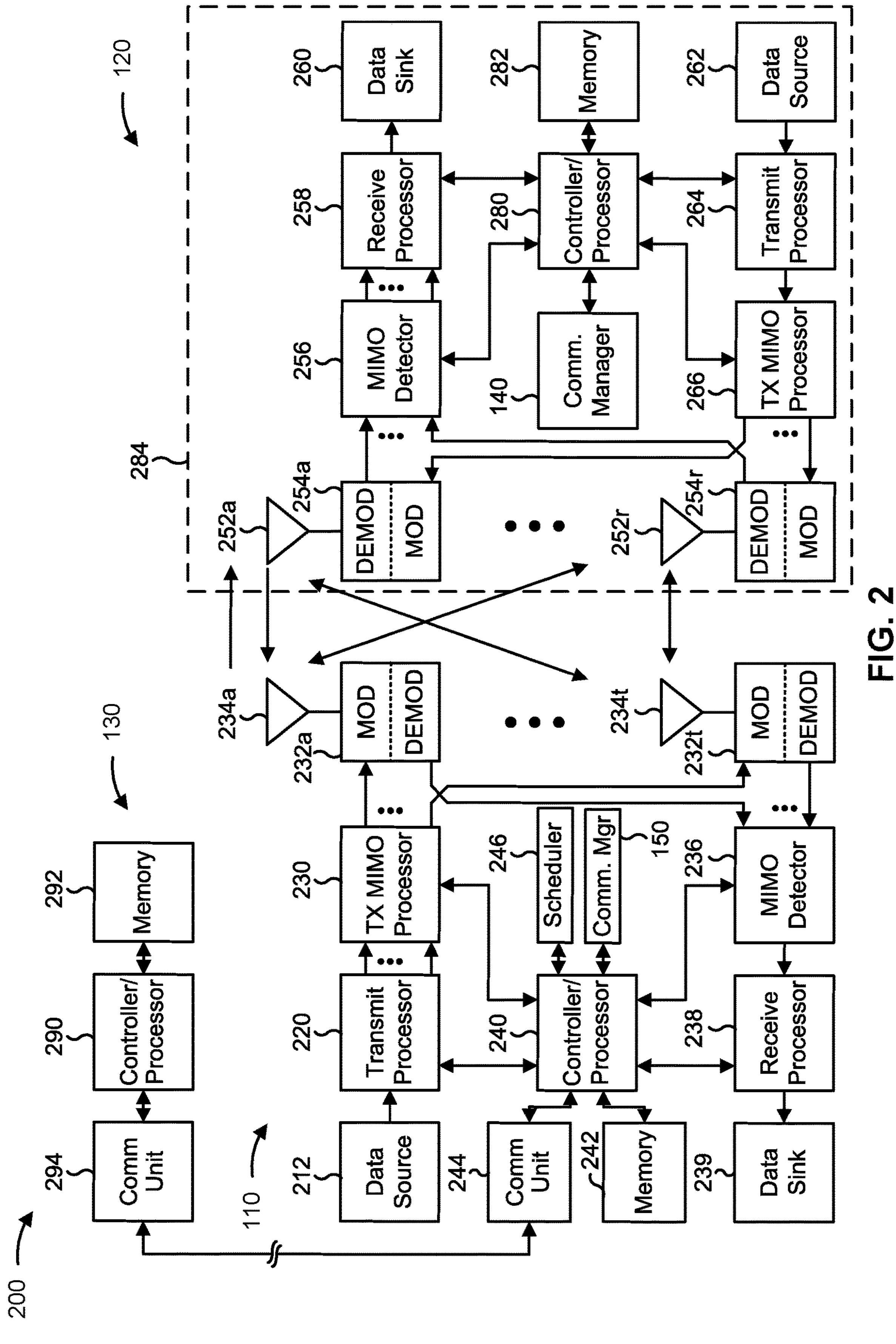
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM) and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-14).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-14).

A controller/processor of a network entity (e.g., the controller/processor 240 of the base station 110), the controller/processor 280 of the UE 120 (mobile station), and/or any other component(s) of FIG. 2) may perform one or more techniques associated with applying a TA with multiple TRPs, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 900 of FIG. 9, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a mobile station (e.g., a UE 120) includes means for selecting an SCS, according to a largest SCS rule, from among SCSs for active uplink BWPs for a CC that is enabled for multiple TRPs, based at least in part on at least two TAGs being configured for the CC and each TAG of the at least two TAGs being associated with multiple active uplink BWPs of multiple CCs; and/or means for transmitting a communication after applying a TA value that is indicated by a TA command associated with the SCS. The means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for selecting an SCS, according to a largest SCS rule, from among SCSs for active uplink BWPs for a CC, configured for a mobile station, that is enabled for multiple TRPs, based at least in part on at least two TAGs being configured for the CC and each TAG of the at least two TAGs being associated with multiple active uplink BWPs of multiple CCs; and/or means for receiving a communication after accounting for a TA value, applied by the mobile station, that is indicated by a TA command associated with the SCS. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a mobile station (e.g., a UE 120) includes means for selecting an SCS, according to a minimum SCS rule, from among SCSs for active uplink BWPs for a CC that is enabled for multiple TRPs, based at least in part on at least two TAGs being configured for the CC, each TAG of the at least two TAGs being associated with multiple active uplink BWPs of multiple CCs, and a communication to be transmitted; and/or means for transmitting the communication after applying a TA value after a TA application time that is based at least in part on the SCS. The communication to be transmitted may be a communication other than uplink data scheduled by an RAR uplink grant or feedback information for a successful RAR.

In some aspects, the network entity includes means for selecting an SCS, according to a minimum SCS rule, from among SCSs for active uplink BWPs for a CC, configured for a mobile station, that is enabled for multiple TRPs, based at least in part on at least two TAGs being configured for the CC, each TAG of the at least two TAGs being associated with multiple active uplink BWPs of multiple CCs, and a communication to be transmitted; and/or means for receiving the communication after accounting for a TA value applied by the mobile station after a TA application time that is based at least in part on the SCS. The communication to be transmitted may be a communication other than uplink data scheduled by an RAR uplink grant or feedback information for a successful RAR.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
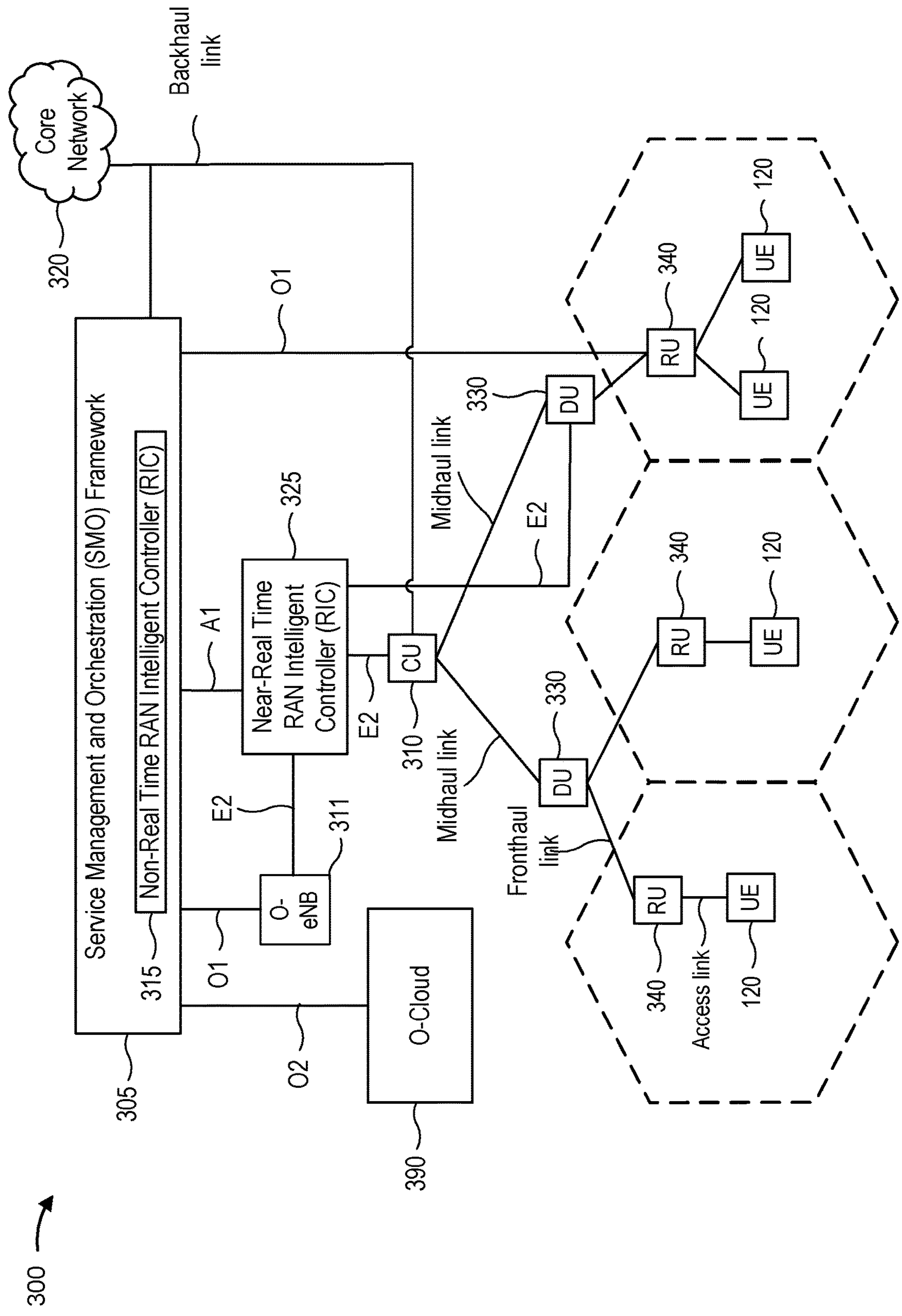
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 3 shows a diagram illustrating an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more radio frequency (RF) access links. In some aspects, the UE 120 may be simultaneously served by multiple RUs 340. The DUs 330 and the RUs 340 may also be referred to as "O-RAN DUS (O-DUs") and "O-RAN RUS (O-RUS)", respectively. A network entity at the RAN may include a CU, a DU, an RU, or any combination of CUs, DUs, and RUs. A network entity at the RAN may include a disaggregated base station or one or more components of the disaggregated base station, such as a CU, a DU, an RU, or any combination of CUs, DUs, and RUs. A network entity at the RAN may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
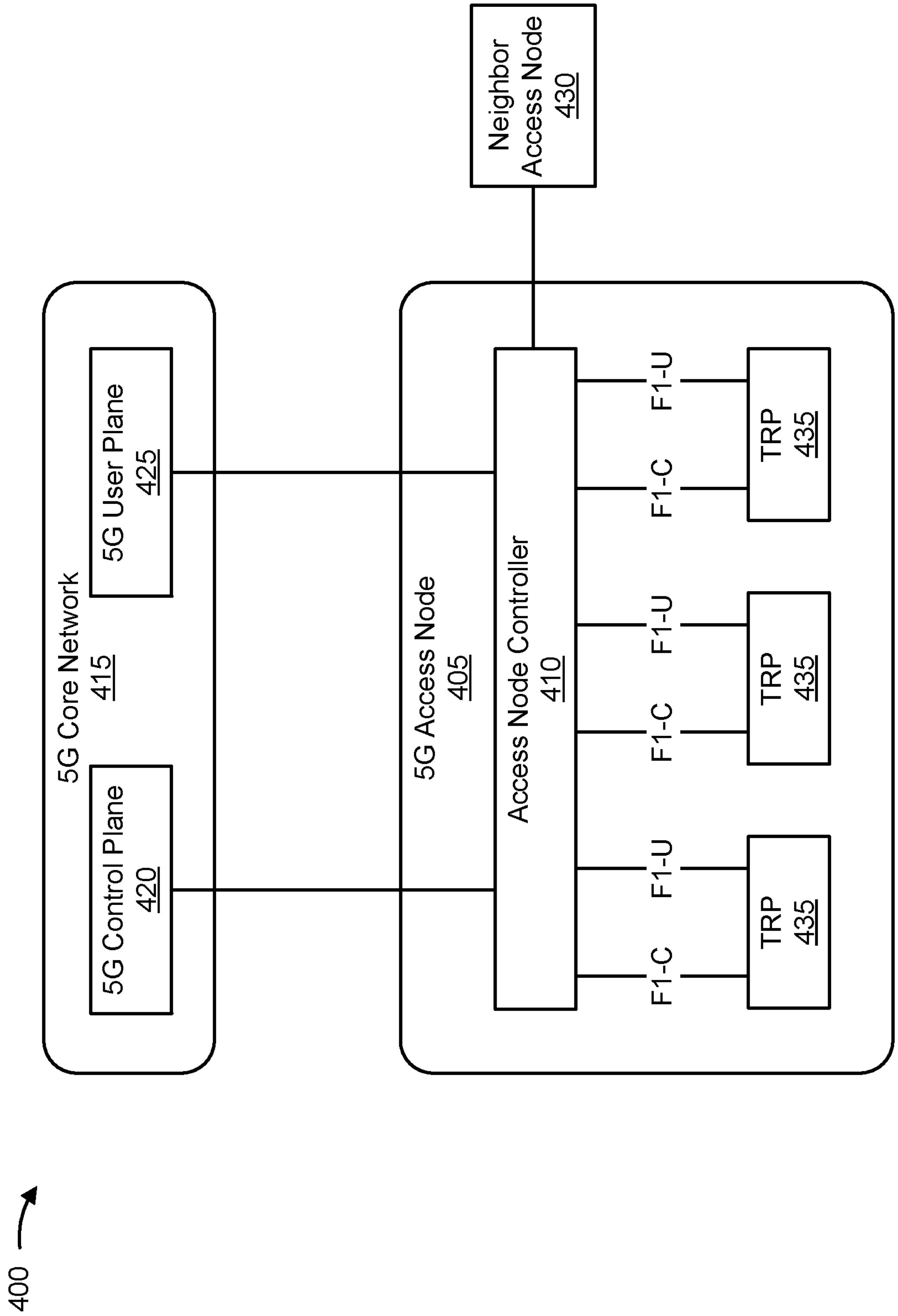
FIG. 4 illustrates an example logical architecture of a distributed radio access network, in accordance with the present disclosure.

FIG. 4 illustrates an example logical architecture of a distributed RAN 400, in accordance with the present disclosure.

A 5G access node 405 may include an access node controller 410. The access node controller 410 may be a CU of the distributed RAN 400 (e.g., disaggregated base station). In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a DU of the distributed RAN 400. In some aspects, a TRP 435 may correspond to a base station 110 described above in connection with FIG. 1. For example, different TRPs 435 may be included in different base stations 110. Additionally, or alternatively, multiple TRPs 435 may be included in a single base station 110. In some aspects, a base station 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400. For example, a PDCP layer, a RLC layer, and/or a MAC layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
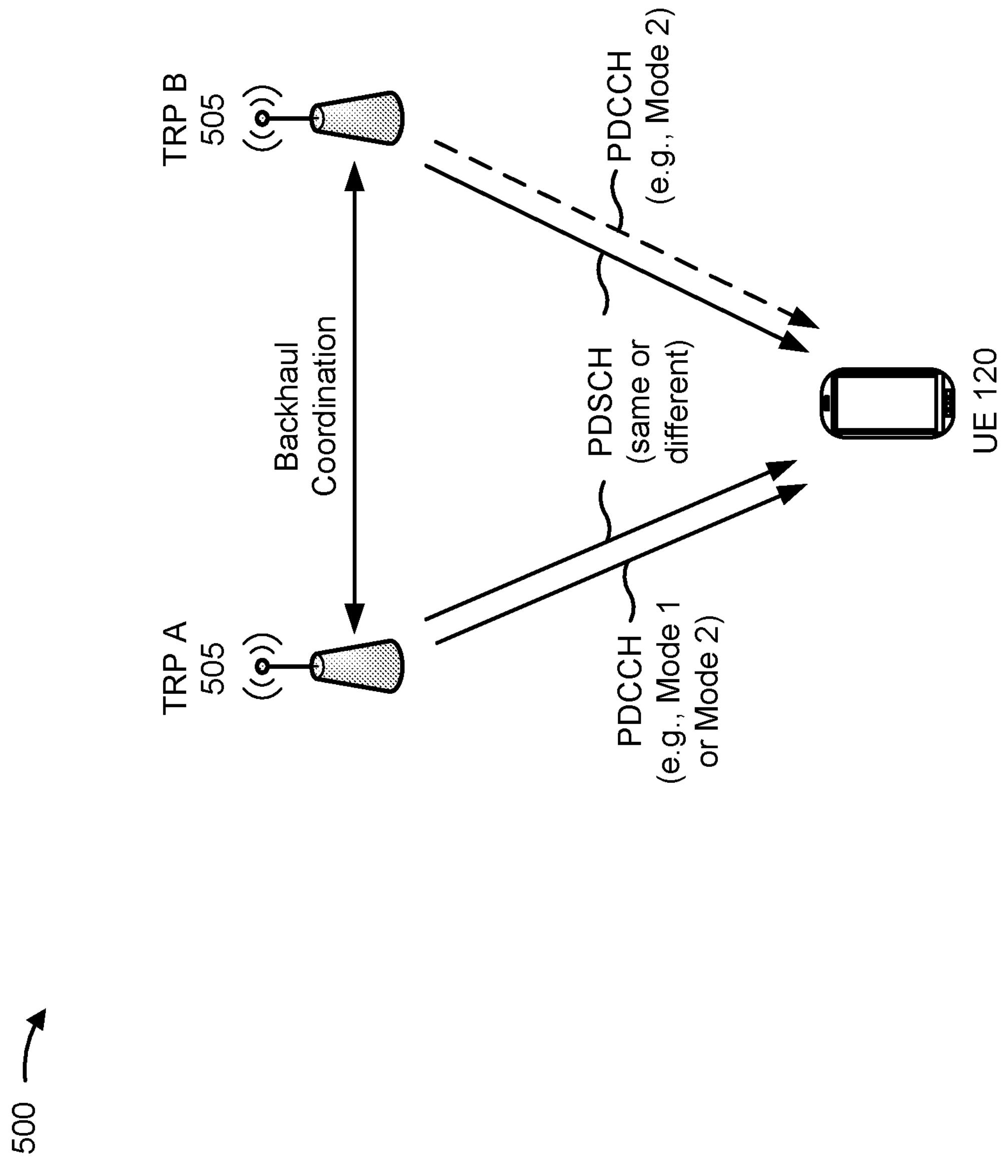
FIG. 5 is a diagram illustrating an example of multiple transmit receive point communication, in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs 505 may communicate with the same mobile station (e.g., same UE 120). A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same base station 110 (e.g., when the TRPs 505 are different antenna arrays or panels of the same base station 110) and may have a larger delay and/or lower capacity (as compared to co-location) when the TRPs 505 are located at different base stations 110. The different TRPs 505 may communicate with the UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1). A UE may receive multiple DCI (mDCI) from the multiple TRPs or a single DCI (sDCI) for the multiple TRPs.

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

A mobile station, such as a UE (e.g., a UE 120), may use a timing advance (TA) to adjust when the UE transmits a communication, in order to align an arrival time for the communication with a subframe timing at a TRP or another network entity. The network entity may transmit a TA command (e.g., in a medium access control control element (MAC CE), via the TRP) that includes a TA value (e.g., time duration) that indicates how early the UE is to transmit a communication. If a UE is in communication with two TRPs, there may be two TAs. For example, a single downlink timing may be used, where the same TA is used for multiple communications from the first TRP 505 and the second TRP 505, or a separate downlink timing may be used, where different TAs are used for different communications.

A TA may have a certain granularity with respect to application of the TA. That is, the granularity may refer to the extent that the TA applies, whether at a CC level (apply to all active uplink BWPs in the CC), at a bandwidth part (BWP) level (apply only to the BWP), at a TAG level (apply to all BWPs for an indicated TAG), and so forth. A BWP is a part of a whole bandwidth. BWPs may be used to apply operations to a limited bandwidth to conserve power.

For a TA command received on uplink slot n and for an uplink transmission other than a physical uplink shared channel (PUSCH) scheduled by an RAR uplink grant or a fallback RAR (fallbackRAR) uplink grant, or a physical uplink control channel (PUCCH) with hybrid automatic repeat request (HARQ) acknowledgement (ACK) feedback information in response to a successful RAR (successRAR), a TA timing for the uplink transmission may apply from the beginning of uplink slot n+k+1, where $$k = N_{slot}^{subframe,u} \times (N_{T,1} + N_{T,2} + N_{TA,max} + 0.5)/T_{sf}.\ N_{T,1}$$

is a time duration (in milliseconds (ms)) of $N_1$ symbols corresponding to a PDSCH processing time for UE processing capability 1 when an additional PDSCH DMRS is configured. $N_{T,2}$ is a time duration (in ms) of $N_2$ symbols corresponding to a PUSCH preparation time for UE processing capability 1. $N_{TA,max}$ is the maximum timing advance value (in ms) that can be provided by a TA command field of 12 bits.

$$N_{slot}^{subframe,u}$$

is the number of slots per subframe, and $T_{sf}$ is the subframe duration of 1 ms. An RAR may be a response to preamble of a PRACH or a response (second message) to a first message that is part of a random access procedure for establishing access. The RAR may include an uplink grant if the preamble or first message was successful, or another uplink grant if the preamble or first message was not successful (use fallback uplink grant).

The symbol duration for the number of symbols $N_1$ and $N_2$ may be determined with respect to the minimum SCS among the SCSs of all configured uplink BWPs for all uplink CCs in a TAG and of all configured downlink BWPs for the corresponding downlink CCs. An SCS used for a BWP may be frequency range by which subcarriers are spaced apart. For example, subcarriers may be spaced 15 kHz apart with an SCS of 15 kHz. An SCS in NR may vary between 15 kHz and 240 kHz.

The slot duration of slot n and the number of symbols in a slot (i.e., $$N_{slot}^{subframe,u})$$

may be determined with respect to the minimum SCS among the SCSs of all configured uplink BWPs for all uplink CCs in the TAG. $N_{TA,max}$ may be determined with respect to the minimum SCS among the SCSs of all configured uplink BWPs for all uplink CCs in the TAG and for all configured initial uplink BWPs provided by parameter field initialUplinkBWP. The uplink slot n may be the last slot among uplink slot(s) overlapping with the slot(s) of PDSCH reception (TA value T_TA=0) where the PDSCH provides the TA command and T_TA is specified.

As indicated above, FIG. 5 is provided as an example. Other examples may differ from what is described with respect to FIG. 5.

Figure 6:
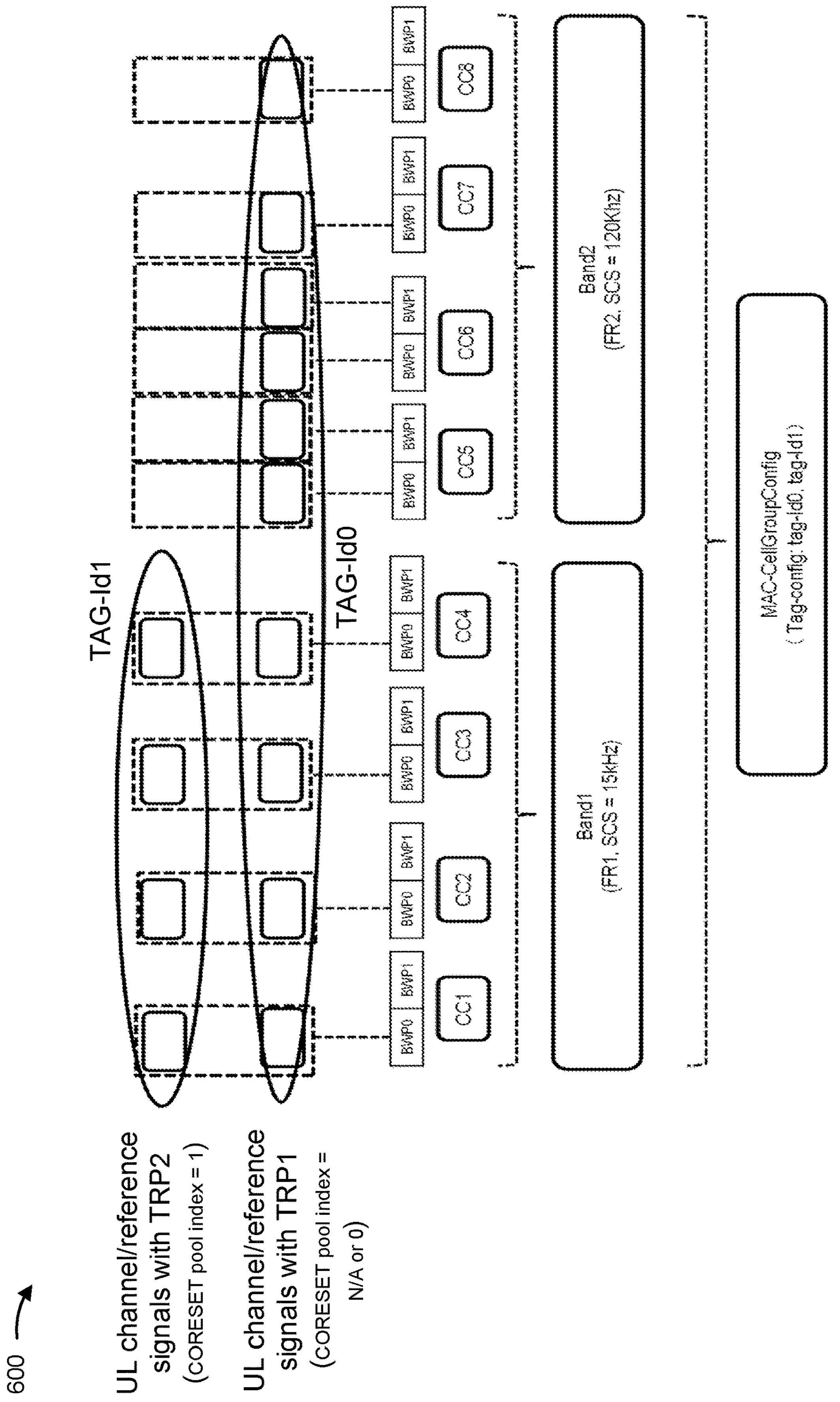
FIG. 6 is a diagram illustrating an example of a timing advance (TA) configuration, in accordance with the present disclosure.

FIG. 6 is a diagram illustrating an example 600 of a TA configuration, in accordance with the present disclosure.

TAs may be configured for multiple TRP (mTRP) operations, which may include sDCI or mDCI mTRP operations. A TA configuration may correspond to a serving cell configuration that includes information about a list of downlink BWPs and/or uplink BWPs. Each downlink BWP may have a PDCCH configuration that indicates a control resource set (CORESET), which indicates a CORESET pool index. Each downlink BWP and uplink BWP may have an SCS. The TA configuration may be common for multiple BWPs of multiple CCs. An mTRP configuration may be specific to a BWP of a CC.

Example 600 shows two TAGs, such as TAG-Id0 and TAG-Id1. A UE may be configured with two TAGs in a CC that is enabled for mTRP operation. Different TAGs may be associated with different sets of CCs, and each CC may have different uplink BWPs (each BWP for use with a particular SCS). Example 600 shows two BWPs per CC. The BWPs of CC1 through CC4 have an SCS of 15 kHz, and the BWPs of CC5 through CC8 have an SCS of 120 kHz. The UE may use the CCs as configured by a TA group configuration (e.g., MAC-CellGroupConfig).

In some aspects, the SCS may determine a time unit for the TA granularity and the TA application time for a CC. A single TA granularity and application time may be determined for a CC, since a CC has only a single TAG. However, there may be multiple SCSs for a single TAG or for multiple TAGs (e.g., two TAGs), and it has not been specified which SCS to select for determining the TA granularity and TA application time when a CC is configured with two TAGs for mTRP operations. Each TAG may be associated with multiple BWPs of multiple CCs where each BWP of a CC may be configured with an SCS. Therefore, a TAG may be related to multiple difference SCSs. Without specification of the SCS to use for TA, some TA mismatches may occur. As a result, communications may degrade, and processing resources and signaling resources may be wasted.

As indicated above, FIG. 6 is provided as an example. Other examples may differ from what is described with regard to FIG. 6.

Figure 7:
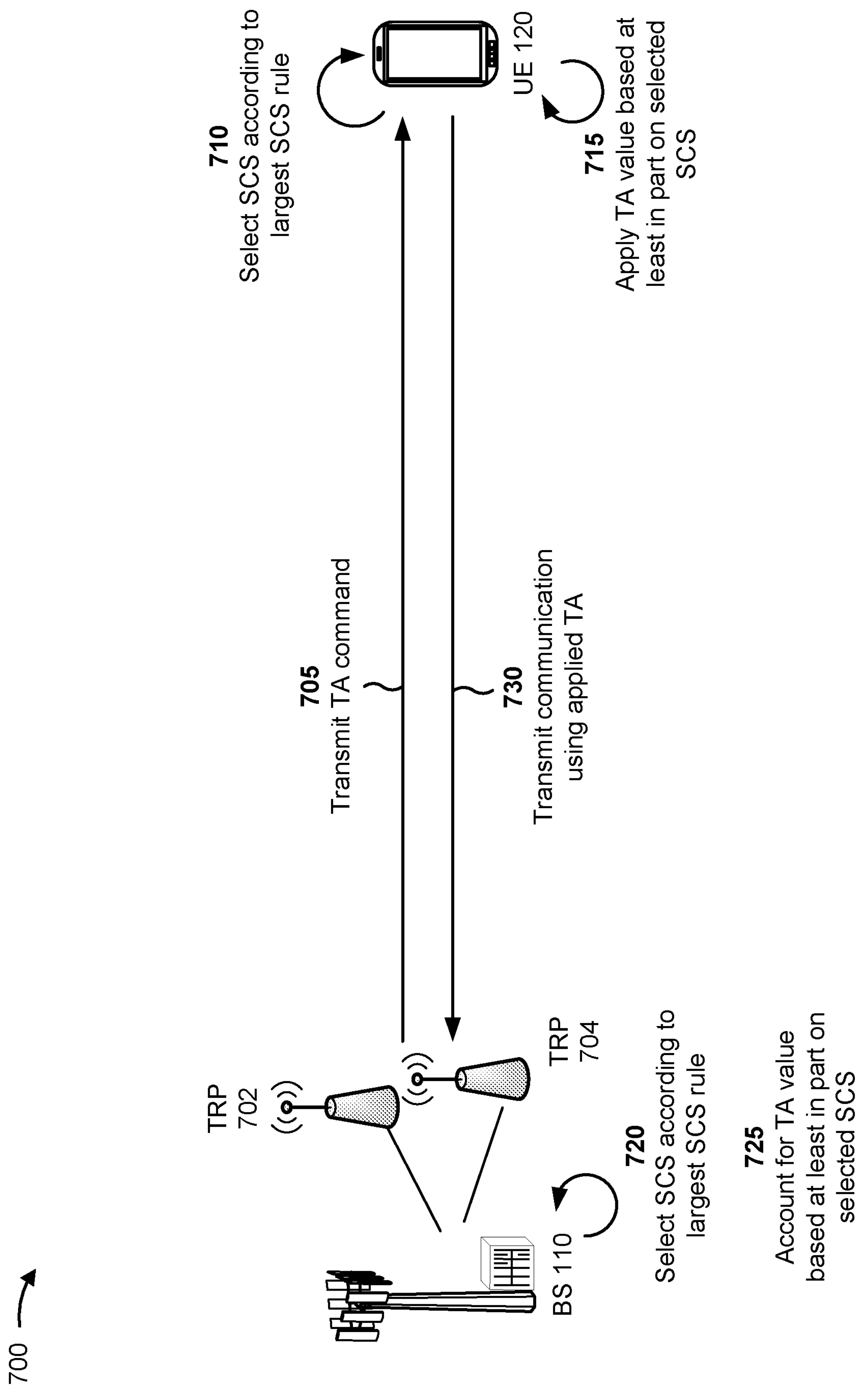
FIG. 7 is a diagram illustrating an example of selecting a subcarrier spacing (SCS) for a TA granularity for applying a TA command, in accordance with the present disclosure.

FIG. 7 is a diagram illustrating an example 700 of selecting an SCS for a TA granularity for applying a TA command, in accordance with the present disclosure. As shown in FIG. 7, a network entity (e.g., base station 110) and a mobile station (e.g., a UE 120) may communicate with one another. The base station 110 may control at least two TRPs, such as TRP 702 and TRP 704. Each TRP may be associated with a TAG, and thus each CC may have multiple active uplink BWPs that can be associated with multiple TAGs (as shown in FIG. 6).

As shown by reference number 705, the base station 110 may transmit a TA command. According to various aspects described herein, the base station 110 may clarify the TA granularity for applying the TA command by specifying selection of an SCS according to a rule.

As shown by reference number 710, the UE 120 may select an SCS according to a largest SCS rule. In some aspects, as a first option, the largest SCS rule may specify that the UE 120 is to select a largest SCS from among SCSs of the multiple active uplink BWPs of multiple CCs associated with an indicated TAG. The base station 110 may have indicated a TAG, from among two TAGs that are configured for a CC that is enabled for mTRP. Each TAG may have multiple active BWPs of multiple CCs, and each BWP may have a corresponding SCS. Selection of the largest SCS may result in different TA granularities in different TAGs for different TRPs of a CC in mTRP (e.g., mDCI) operation.

In some aspects, as a second option, the largest SCS rule may specify that the UE 120 is to select a largest SCS from among SCSs of the multiple active uplink BWPs of multiple CCs associated with the at least two TAGs. This may result in a single TA granularity in different TAGs for different TRPs of a CC in mTRP (e.g., mDCI) operation.

As shown by reference number 715, the UE 120 may apply the TA (e.g., apply the TA value) based at least in part on the selected SCS. For example, if the UE 120 has multiple active uplink BWPs in multiple CCs, the TA value that is used may have a time granularity (i.e., TA granularity) associated with the largest SCS from among SCSs of the multiple active uplink BWPs of multiple CCs for an indicated TAG (rule first option) or associated with the largest SCS from among SCSs of the multiple active uplink BWPs of multiple CCs for the at least two TAGs (rule second option). The TA value may indicate a number of time units where the time granularity (e.g., size or type of time unit) for the time units is determined from the SCS. For example, a particular time granularity (e.g., time unit or time unit size) may correspond to or may be associated with a particular SCS. The UE 120 may determine the time duration of time adjustment for a TA value based on the number of time units indicated by the TA command, and the time granularity determined from the selected SCS. All other BWPs (with possibly different SCSs) are to align their timing with the TA value associated with the selected SCS. The TA value may be used for the multiple BWPs of multiple CCs associated with the same TAG. The TA value for a TAG may be indicated by TA commands for the TAG.

As shown by reference number 720, the base station 110 may also select the SCS according to the largest SCS rule, as the base station 110 is aware of the rule that the UE 120 is to use (e.g., the base station 110 may have configured the UE 120 with the largest SCS rule). As shown by reference number 725, the base station 110 may expect and account for a TA value that the UE 120 is to apply, based at least in part on the selected SCS.

As shown by reference number 730, the UE 120 may transmit a communication after applying the TA value (e.g., delay transmission according to TA value). The base station 110, or the associated TRP, may be prepared to receive the communication in alignment or synchronization with a communication timing at the TRP. The base station 110 may transmit the TA command (e.g., via TRP 702) such that communications are aligned or synchronized for multiple TRPs. As a result of an aligned or synchronized timing of communications at the TRPs, communications may improve, and the network entity and the mobile station may conserve processing resources and signaling resources.

As indicated above, FIG. 7 is provided as an example. Other examples may differ from what is described with respect to FIG. 7.

Figure 8:
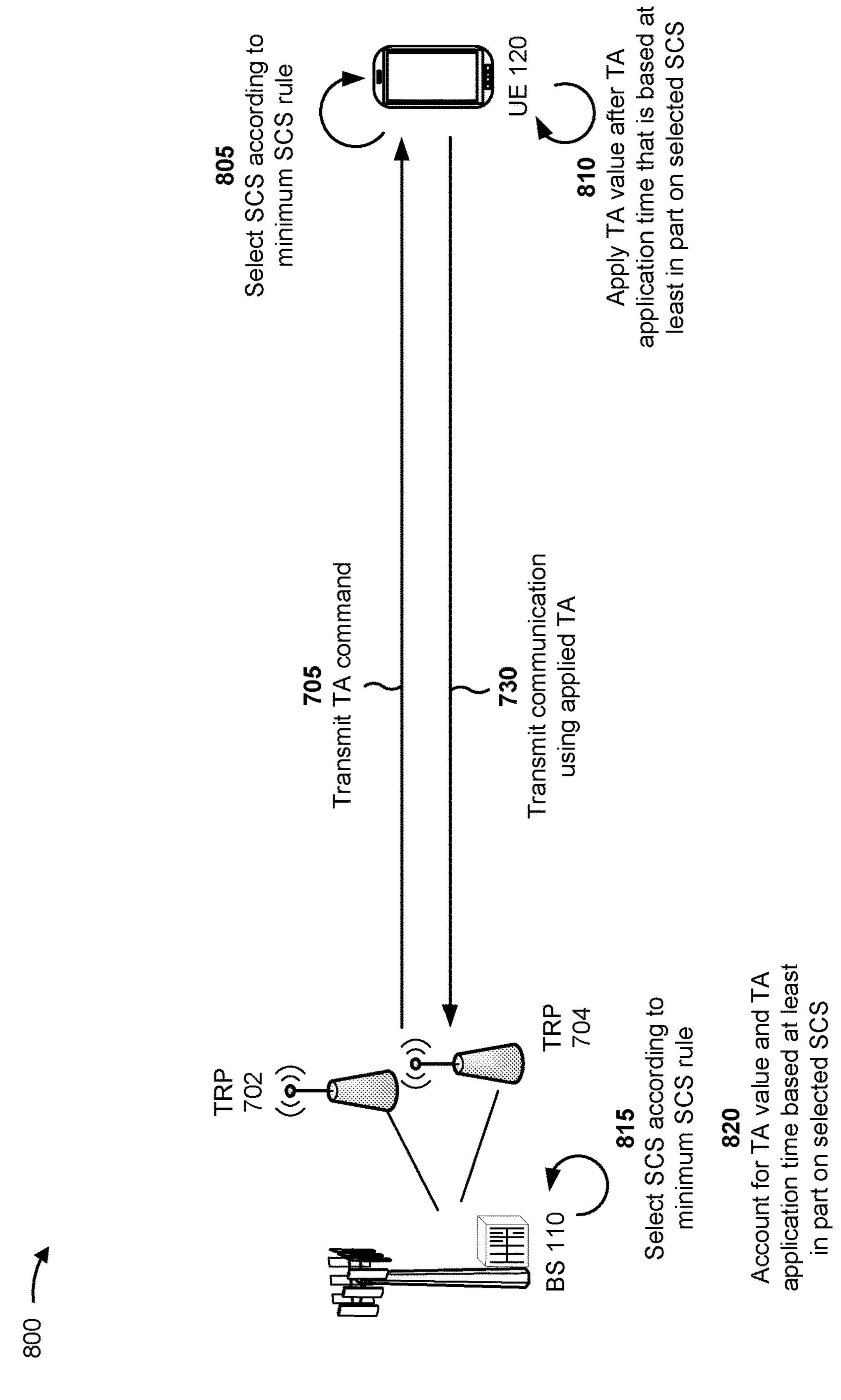
FIG. 8 is a diagram illustrating an example of selecting an SCS for a TA value and/or TA application time, in accordance with the present disclosure.

FIG. 8 is a diagram illustrating an example 800 of selecting an SCS for a TA value and/or TA application time, in accordance with the present disclosure. As shown in FIG. 8, a network entity (e.g., base station 110) and a mobile station (e.g., UE 120) may communicate with one another. The base station 110 may control at least two TRPs, such as TRP 702 and TRP 704. Each TRP may be associated with a TAG, and thus each CC may have multiple active uplink BWPs that can be associated with multiple TAGs.

According to various aspects described herein, the base station 110 may clarify the TA application time for applying the TA value of the TA command. A TA value of the TA command may be the amount of time adjustment. The TA application time may be the amount of time for the UE to process the TA command and update the TA value. A UE 120 may be configured with two TAGs for a CC that is enabled for mTRP operation, and for each of the two TAGs, the UE 120 may have multiple active uplink BWPs of multiple CCs in the same TAG. For a TA command received on uplink slot n and for a transmission other than a PUSCH scheduled by a RAR uplink grant or a fallback RAR uplink grant, or a PUCCH with HARQ-ACK feedback in response to a successful RAR, the corresponding adjustment of the uplink transmission timing may apply from the beginning of uplink slot n+k+1. That is, applying the TA value indicated by a TA command may include applying the TA value after a TA application time, such as later at slot n+k+1. The parameters for determining the time duration of k for the TA application time may include a time granularity determined from a selected SCS, the quantity of symbols $N_1$ and $N_2$ in a slot (for processing), slot index n, the quantity of slots $$N_{slot}^{subframe,u}$$

in a subframe, and a maximum quantity of symbols $N_{TA,max}$ for applying the TA value.

As shown by reference number 805, the UE 120 may select the SCS according to a minimum SCS rule for determining the time duration of k. In some aspects, as a first option, the minimum SCS rule may specify that the UE 120 is to select a minimum SCS from among SCSs of the multiple active uplink BWPs for all uplink CCs in an indicated TAG and from among SCSs of configured downlink BWPs for corresponding downlink CCs. This may result in different time durations for the TA application times in different TAGs for different TRPs of a CC in mTRP (e.g., mDCI) operation.

In some aspects, as a second option, the minimum SCS rule may specify that the UE 120 is to select a minimum SCS from among SCSs of the multiple active uplink BWPs for all uplink CCs in the at least two TAGs and from among SCSs of configured downlink BWPs for corresponding downlink CCs. This may result in a single common time duration for the TA application time in different TAGs for different TRPs of a CC in mTRP (e.g., mDCI) operation.

As shown by reference number 810, the UE 120 may apply the TA value for the TA command received at slot n based at least in part on the selected SCS. For a TA command received on uplink slot n and for a transmission other than a PUSCH scheduled by a RAR UL grant or a fallbackRAR UL grant, or a PUCCH with HARQ-ACK information in response to a successRAR, the UE 120 may apply the corresponding adjustment of the uplink transmission timing (i.e., timing based on the TA value updated by the TA command and the TA granularity) from the beginning of uplink slot n+k+1, where the time duration of k for the TA application time is determined from the selected SCS. For example, if a UE has multiple active uplink BWPs, the TA value that is used is associated with the minimum SCS from among SCSs of the multiple active uplink BWPs of multiple CCs for an indicated TAG (rule first option) or from among SCSs of the multiple active uplink BWPs of multiple CCs for the at least two TAGs (rule second option). All other BWPs (with possibly different SCSs) are to align their uplink transmission timing with the timing based on the TA value and/or the TA application time associated with the selected SCS.

As shown by reference number 815, the base station 110 may also select the SCS according to the minimum SCS rule, as the base station 110 is aware of the rule that the UE 120 is to use (e.g., the base station 110 may have configured the UE 120 with the minimum SCS rule). As shown by reference number 820, the base station 110 may account for a TA value to be applied after a TA application time that is based at least in part on the selected SCS. For example, accounting for the TA value may include expecting the UE 120 to apply the TA value for the communication at a slot n+k+1, where k is based at least in part on a quantity of processing symbols in a slot, a quantity of slots in a subframe, and a maximum quantity of symbols for applying a TA value. In some aspects, the TA value and/or the TA application time may be based at least in part on the selected SCS, or a time granularity determined from the selected SCS.

As shown by reference number 730, the UE 120 may transmit a communication using the applied TA value (and delay transmission according to the TA value). The base station 110, or the associated TRP, may be prepared to receive the communication in alignment or synchronization with communications at the TRP. As a result of synchronized timing of communication, communications may improve, and the network entity and the UE 120 may conserve processing resources and signaling resources.

As indicated above, FIG. 8 is provided as an example. Other examples may differ from what is described with respect to FIG. 8.

Figure 9:
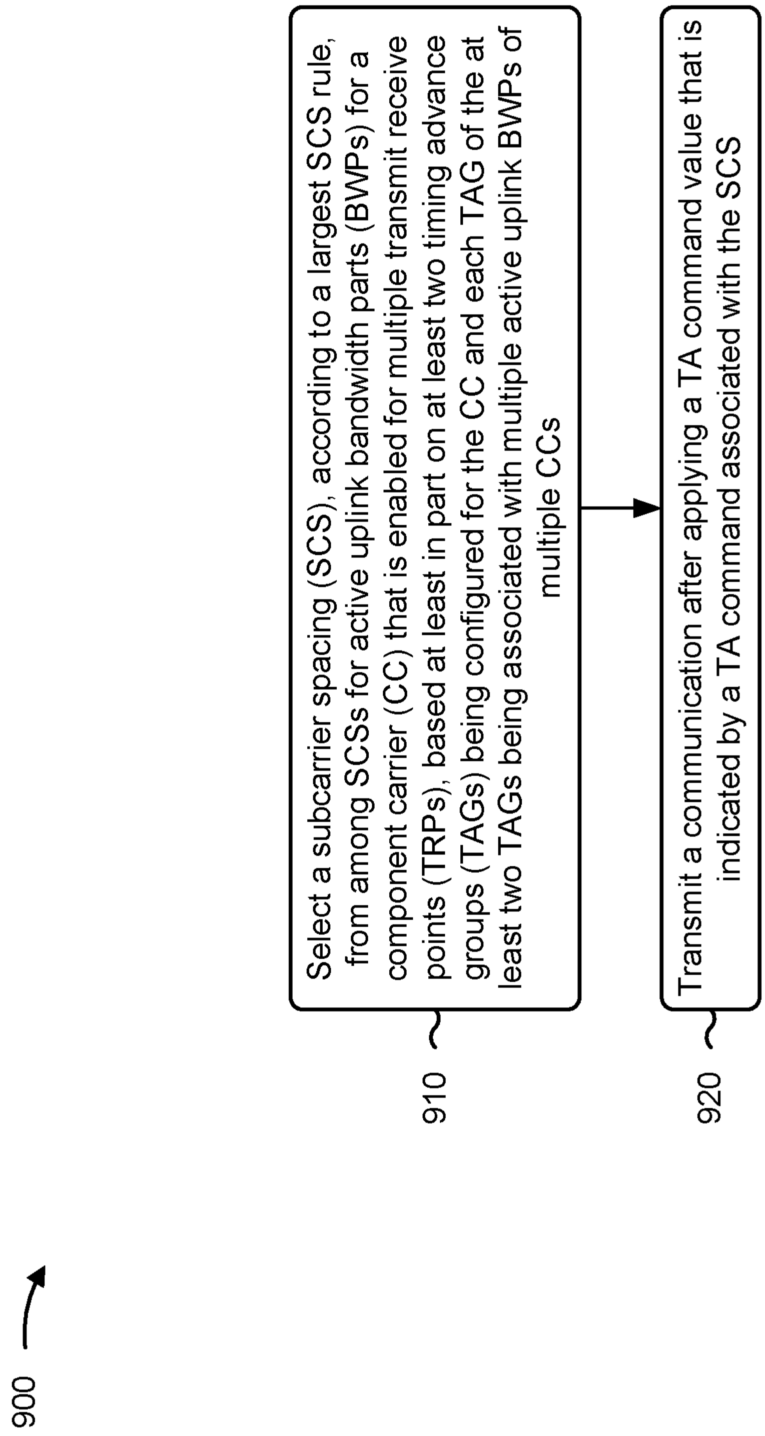
FIG. 9 is a diagram illustrating an example process performed, for example, by a UE, in accordance with the present disclosure.

FIG. 9 is a diagram illustrating an example process 900 performed, for example, by a mobile station, in accordance with the present disclosure. Example process 900 is an example where the mobile station (e.g., a UE 120) performs operations associated with applying a TA with multiple TRPs.

As shown in FIG. 9, in some aspects, process 900 may include selecting an SCS, according to a largest SCS rule, from among SCSs for active uplink BWPs for a CC that is enabled for multiple TRPs, based at least in part on at least two TAGs being configured for the CC and each TAG of the at least two TAGs being associated with multiple active uplink BWPs of multiple CCs (block 910). For example, the mobile station (e.g., using communication manager 1308 and/or selection component 1310 depicted in FIG. 13) may select an SCS, according to a largest SCS rule, from among SCSs for active uplink BWPs for a CC that is enabled for multiple TRPs, based at least in part on at least two TAGs being configured for the CC and each TAG of the at least two TAGs being associated with multiple active uplink BWPs of multiple CCs, as described above.

As further shown in FIG. 9, in some aspects, process 900 may include transmitting a communication after applying a TA value that is indicated by a TA command associated with the SCS (block 920). For example, the mobile station (e.g., using communication manager 1308 and/or transmission component 1304 depicted in FIG. 13) may transmit a communication based on a time adjustment after applying a TA value that is indicated by a TA command associated with the SCS, as described above.

Process 900 may include additional aspects, such as any single aspect or any combination of aspects described below and/or in connection with one or more other processes described elsewhere herein.

In a first aspect, the largest SCS rule specifies that the mobile station is to select a largest SCS from among SCSs of the multiple active uplink BWPs associated with an indicated TAG. The multiple active uplink BWPs may be in different CCs associated with the indicated TAG. Process 900 may include applying the selected SCS to determine the time granularity of the TA value for the time adjustment.

In a second aspect, alone or in combination with the first aspect, the largest SCS rule specifies that the mobile station is to select a largest SCS from among SCSs of the multiple active uplink BWPs associated with the at least two TAGs. The multiple active uplink BWPs may be in different CCs associated with the at least two TAGs.

In a third aspect, alone or in combination with one or more of the first and second aspects, the CC is enabled for mDCI for the multiple TRPs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
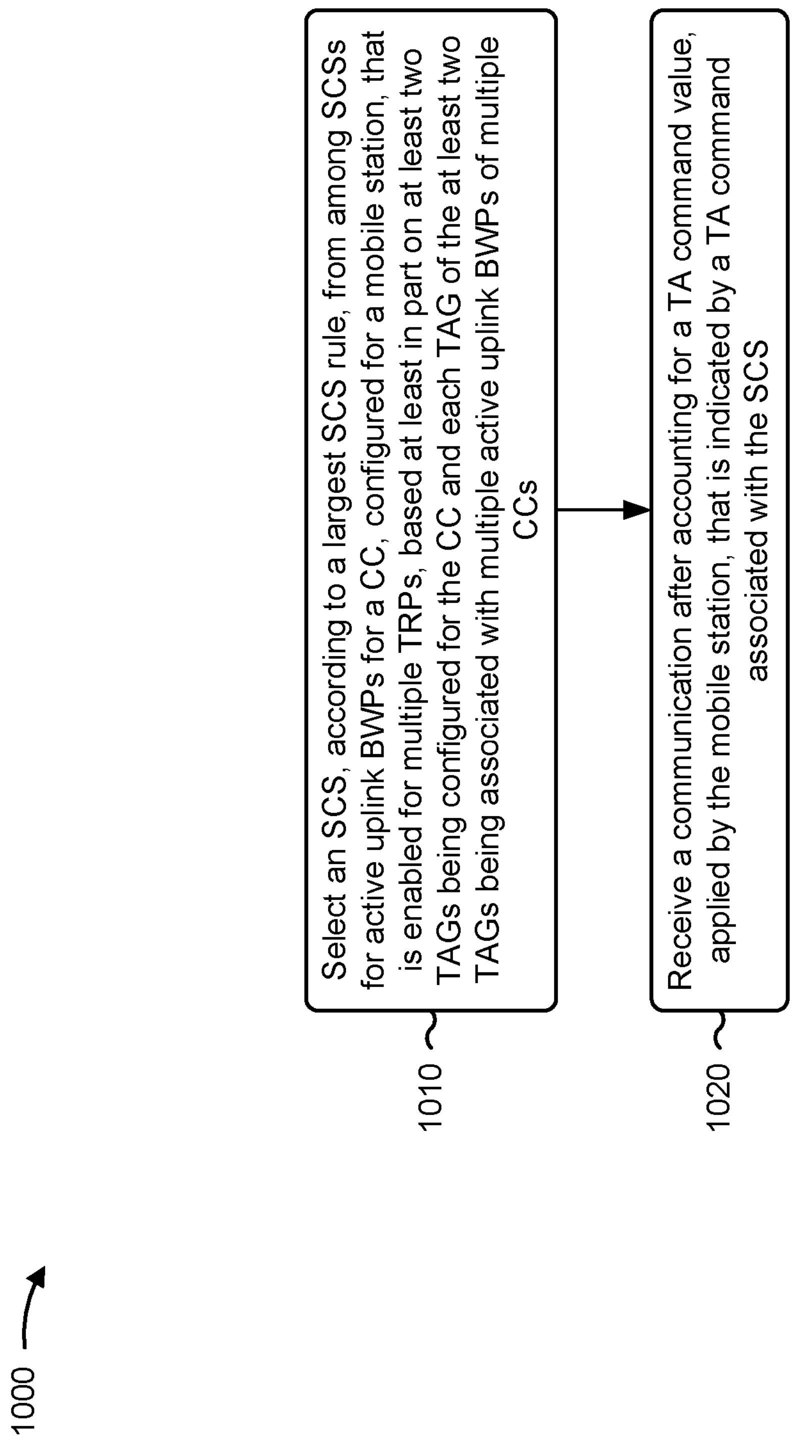
FIG. 10 is a diagram illustrating an example process performed, for example, by a network entity, in accordance with the present disclosure.

FIG. 10 is a diagram illustrating an example process 1000 performed, for example, by a network entity, in accordance with the present disclosure. Example process 1000 is an example where the network entity (e.g., base station 110, TRP 702, TRP 704) performs operations associated with applying a TA.

As shown in FIG. 10, in some aspects, process 1000 may include selecting an SCS, according to a largest SCS rule, from among SCSs for active uplink BWPs for a CC, configured for a mobile station, that is enabled for multiple TRPs, based at least in part on at least two TAGs being configured for the CC and each TAG of the at least two TAGs being associated with multiple active uplink BWPs of multiple CCs (block 1010). For example, the network entity (e.g., using communication manager 1408 and/or selection component 1410 depicted in FIG. 14) may select an SCS, according to a largest SCS rule, from among SCSs for active uplink BWPs for a CC, configured for a mobile station, that is enabled for multiple TRPs, based at least in part on at least two TAGs being configured for the CC and each TAG of the at least two TAGs being associated with multiple active uplink BWPs of multiple CCs, as described above.

As further shown in FIG. 10, in some aspects, process 1000 may include receiving a communication after accounting for a TA value, applied by the UE, that is indicated by a TA command associated with the SCS (block 1020). For example, the network entity (e.g., using communication manager 1408 and/or reception component 1402 depicted in FIG. 14) may receive a communication after accounting for a TA value, applied by the mobile station, that is indicated by a TA command associated with the SCS, as described above.

Process 1000 may include additional aspects, such as any single aspect or any combination of aspects described below and/or in connection with one or more other processes described elsewhere herein.

In a first aspect, the largest SCS rule specifies that the mobile station is to select a largest SCS from among SCSs of the multiple active uplink BWPs associated with an indicated TAG.

In a second aspect, alone or in combination with the first aspect, the largest SCS rule specifies that the mobile station is to select a largest SCS from among SCSs of the multiple active uplink BWPs associated with the at least two TAGs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
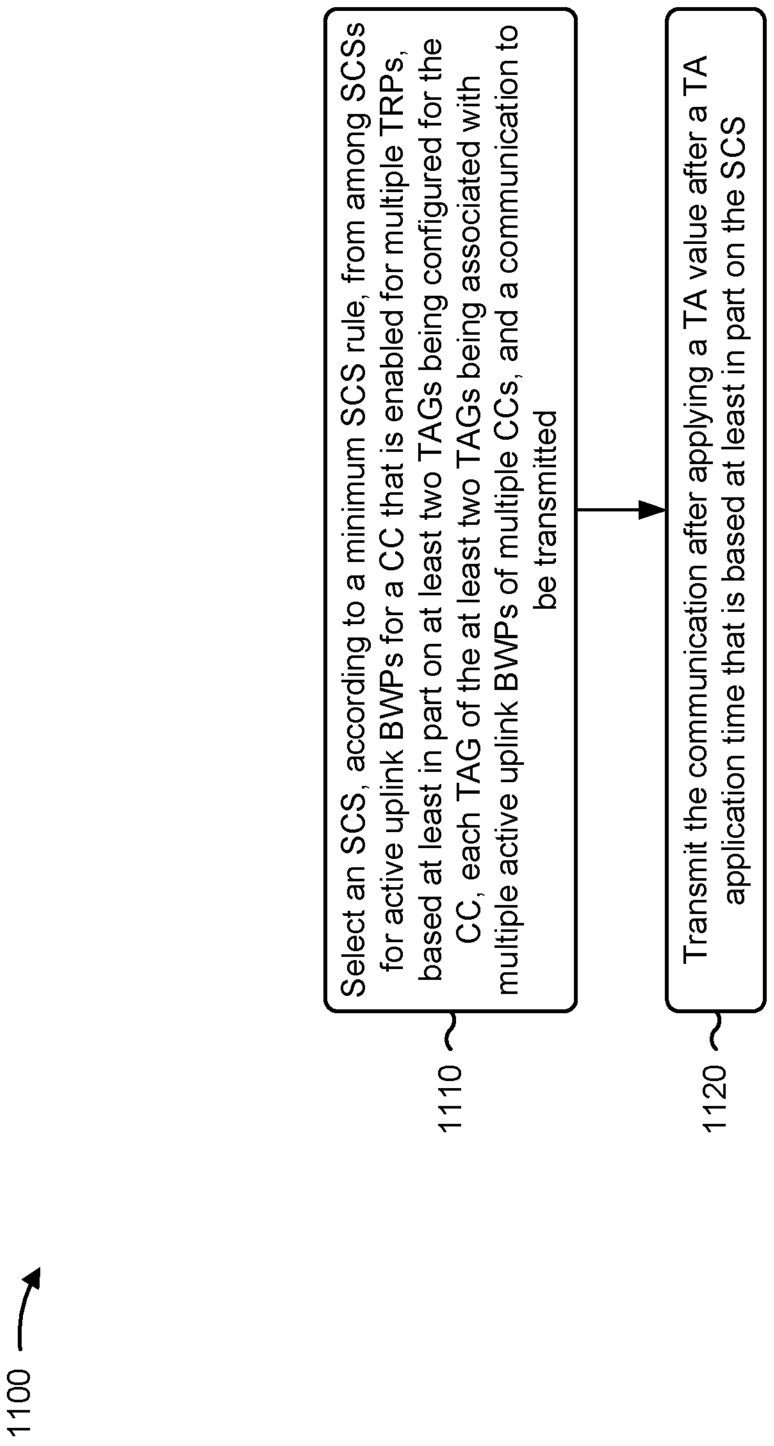
FIG. 11 is a diagram illustrating an example process performed, for example, by a UE, in accordance with the present disclosure.

FIG. 11 is a diagram illustrating an example process 1100 performed, for example, by a mobile station, in accordance with the present disclosure. Example process 1100 is an example where the mobile station (e.g., a UE 120) performs operations associated with applying a TA with multiple TRPs.

As shown in FIG. 11, in some aspects, process 1100 may include selecting an SCS, according to a minimum SCS rule, from among SCSs for active uplink BWPs for a CC that is enabled for multiple TRPs, based at least in part on at least two TAGs being configured for the CC, each TAG of the at least two TAGs being associated with multiple active uplink BWPs of multiple CCs (block 1110). The selection may be further based at least in part on a communication to be transmitted. The communication may be a communication other than uplink data scheduled by an RAR uplink grant or feedback information for a successful RAR. For example, the mobile station (e.g., using communication manager 1308 and/or selection component 1310 depicted in FIG. 13) may select an SCS, according to a minimum SCS rule, from among SCSs for active uplink BWPs for a CC that is enabled for multiple TRPs, based at least in part on at least two TAGs being configured for the CC, each TAG of the at least two TAGs being associated with multiple active uplink BWPs of multiple CCs, as described above. The selection may be further based at least in part on a communication to be transmitted. The communication may be a communication other than uplink data scheduled by an RAR uplink grant or feedback information for a successful RAR.

As further shown in FIG. 11, in some aspects, process 1100 may include transmitting the communication after applying a TA value after a TA application time that is based at least in part on the SCS (block 1120). For example, the mobile station (e.g., using communication manager 1308 and/or transmission component 1304 depicted in FIG. 13)

may transmit the communication after applying a TA value after a TA application time that is based at least in part on the SCS, as described above.

Process 1100 may include additional aspects, such as any single aspect or any combination of aspects described below and/or in connection with one or more other processes described elsewhere herein.

In a first aspect, the minimum SCS rule specifies that the mobile station is to select a minimum SCS from among SCSs of the multiple active uplink BWPs for all uplink CCs in an indicated TAG and from among SCSs of configured downlink BWPs for corresponding downlink CCs.

In a second aspect, alone or in combination with the first aspect, the minimum SCS rule specifies that the mobile station is to select a minimum SCS from among SCSs of the multiple active uplink BWPs for all uplink CCs in the at least two TAGs and from among SCSs of configured downlink BWPs for corresponding downlink CCs.

In a third aspect, alone or in combination with one or more of the first and second aspects, a TA command is received at a slot n, and applying the TA value after a TA application time includes applying the TA value for the communication at a slot n+k+1, and k is based at least in part on a quantity of processing symbols in a slot, a quantity of slots in a subframe, and a maximum quantity of symbols for applying a TA value.

In a fourth aspect, alone or in combination with one or more of the first through third aspects, the CC is enabled for mDCI for the multiple TRPs.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
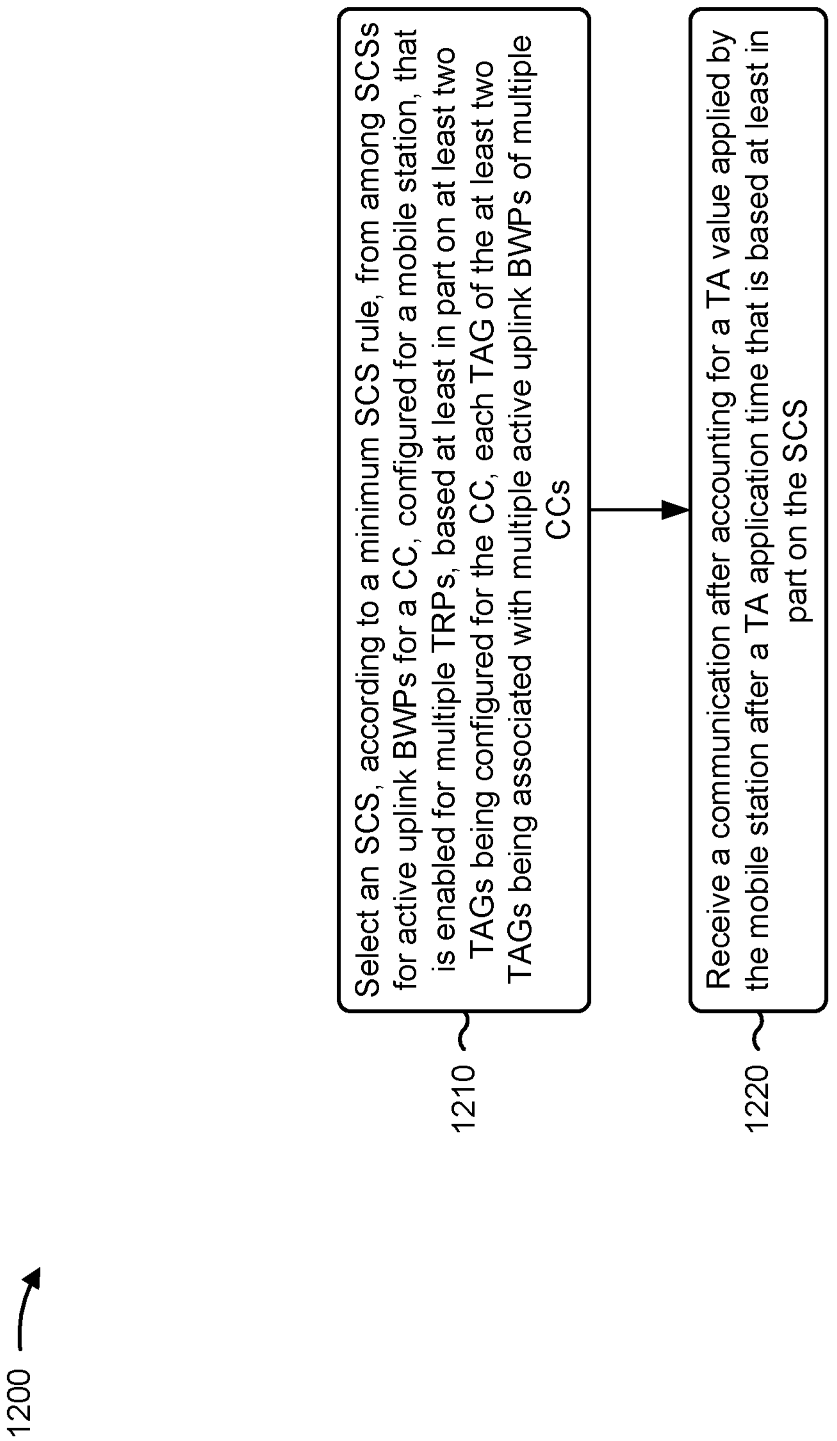
FIG. 12 is a diagram illustrating an example process performed, for example, by a network entity, in accordance with the present disclosure.

FIG. 12 is a diagram illustrating an example process 1200 performed, for example, by a network entity, in accordance with the present disclosure. Example process 1200 is an example where the network entity (e.g., base station 110, TRP 702, TRP 704) performs operations associated with applying a TA.

As shown in FIG. 12, in some aspects, process 1200 may include selecting an SCS, according to a minimum SCS rule, from among SCSs for active uplink BWPs for a CC, configured for a mobile station, that is enabled for multiple TRPs, based at least in part on at least two TAGs being configured for the CC, each TAG of the at least two TAGs being associated with multiple active uplink BWPs of multiple CCs. (block 1210). The SCS may be selected further based at least in part on a communication to be transmitted. The communication may be a communication other than uplink data scheduled by an RAR uplink grant or feedback information for a successful RAR. For example, the network entity (e.g., using communication manager 1408 and/or selection component 1410 depicted in FIG. 14) may select an SCS, according to a minimum SCS rule, from among SCSs for active uplink BWPs for a CC, configured for a mobile station, that is enabled for multiple TRPs, based at least in part on at least two TAGs being configured for the CC, each TAG of the at least two TAGs being associated with multiple active uplink BWPs of multiple CCs, as described above. The SCS may be selected further based at least in part on a communication to be transmitted. The communication may be a communication other than uplink data scheduled by an RAR uplink grant or feedback information for a successful RAR.

As further shown in FIG. 12, in some aspects, process 1200 may include receiving the communication after accounting for a TA timing, applied by the mobile station, that is based at least in part on the SCS (block 1220). For example, the network entity (e.g., using communication manager 1408 and/or reception component 1402 depicted in FIG. 14) may receive the communication after accounting for a TA value applied by the mobile station after a TA application time that is based at least in part on the SCS, as described above.

Process 1200 may include additional aspects, such as any single aspect or any combination of aspects described below and/or in connection with one or more other processes described elsewhere herein.

In a first aspect, the minimum SCS rule specifies that the mobile station is to select a minimum SCS from among SCSs of the multiple active uplink BWPs for all uplink CCs in an indicated TAG and from among SCSs of configured downlink BWPs for corresponding downlink CCs.

In a second aspect, alone or in combination with the first aspect, the minimum SCS rule specifies that the mobile station is to select a minimum SCS from among SCSs of the multiple active uplink BWPs for all uplink CCs in the at least two TAGs and from among SCSs of configured downlink BWPs for corresponding downlink CCs.

In a third aspect, alone or in combination with one or more of the first and second aspects, a TA command is expected to be received by the mobile station at a slot n, where accounting for the TA value includes expecting the mobile station to apply the TA value for the communication at a slot n+k+1, and k is based at least in part on a quantity of processing symbols in a slot, a quantity of slots in a subframe, and a maximum quantity of symbols for applying a TA value.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
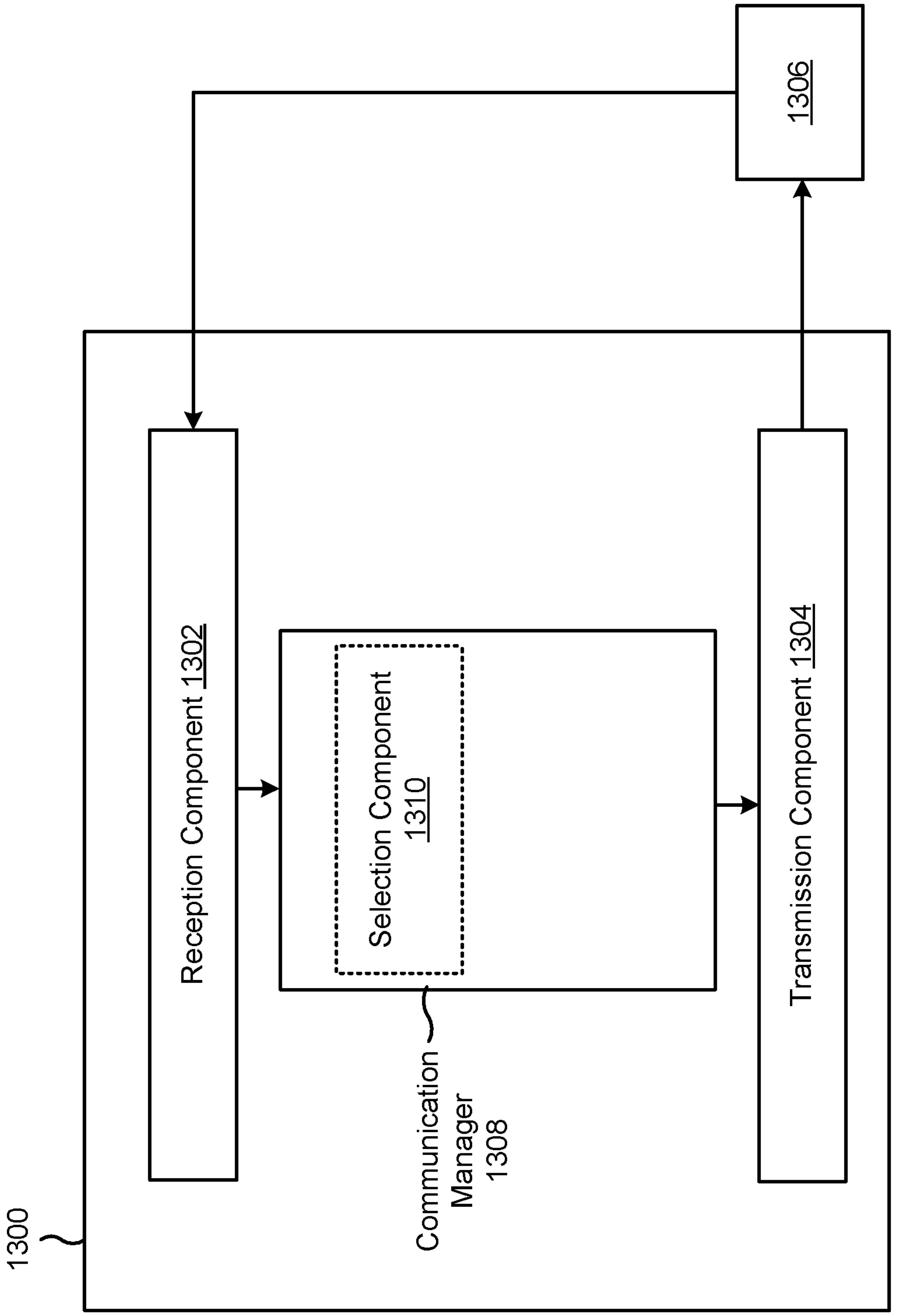
FIGS. 13-14 are diagrams of example apparatuses for wireless communication, in accordance with the present disclosure.

FIG. 13 is a diagram of an example apparatus 1300 for wireless communication. The apparatus 1300 may be a mobile station (e.g., a UE 120), or a mobile station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a mobile station, a UE, a base station, or another wireless communication device) using the reception component 1302 and the transmission component 1304. As further shown, the apparatus 1300 may include the communication manager 1308. The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the base station described in connection with FIG. 2. The communication manager 1308 may be, or be similar to, the communication manager 140 depicted in FIGS. 1 and 2. For example, in some aspects, the communication manager 1308 may be configured to perform one or more of the functions described as being performed by the communication manager 140. In some aspects, the communication manager 1308 may include the reception component 1302 and/or the transmission component 1304. The communication manager 1308 may include a selection component 1310, among other examples.

In some aspects, the apparatus 1300 may be configured to perform one or more operations described herein in connection with FIGS. 1-8. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

In some aspects, the selection component 1310 may select an SCS, according to a largest SCS rule, from among SCSs for active uplink BWPs for a CC that is enabled for multiple TRPs, based at least in part on at least two TAGs being configured for the CC and each TAG of the at least two TAGs being associated with multiple active uplink BWPs of multiple CCs. The transmission component 1304 may transmit a communication after applying a TA value that is indicated by a TA command associated with the SCS.

In some aspects, the selection component 1310 may select an SCS, according to a minimum SCS rule, from among SCSs for active uplink BWPs for a CC that is enabled for multiple TRPs, based at least in part on at least two TAGs being configured for the CC, each TAG of the at least two TAGs being associated with multiple active uplink BWPs of multiple CCs, and a communication to be transmitted being other than uplink data scheduled by an RAR uplink grant or feedback information for a successful RAR. The transmission component 1304 may transmit the communication after applying a TA value after a TA application time that is based at least in part on a granularity that corresponds to the SCS.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
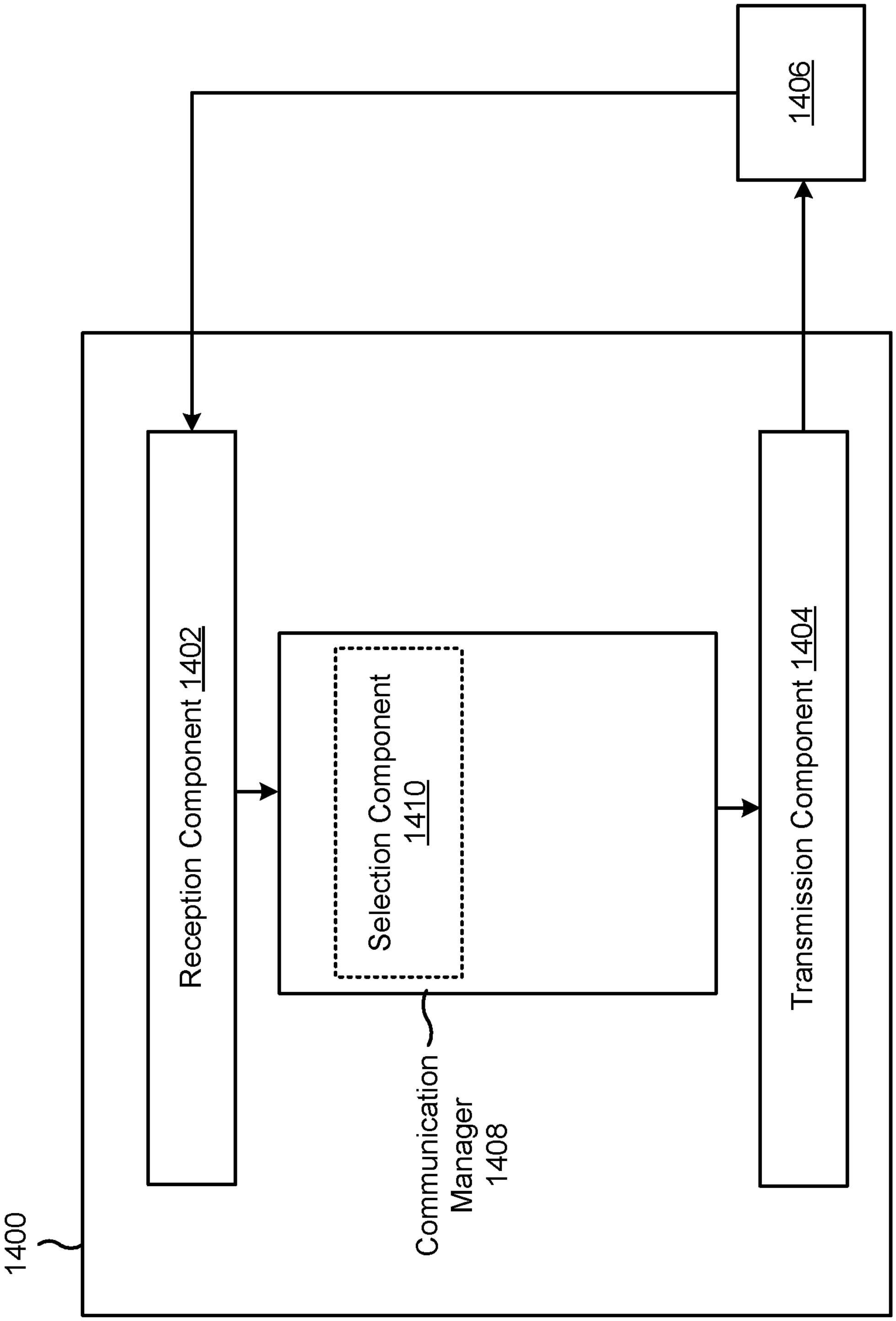

FIG. 14 is a diagram of an example apparatus 1400 for wireless communication. The apparatus 1400 may be a network entity (e.g., base station 110), or a network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a mobile station, a UE, a base station, or another wireless communication device) using the reception component 1402 and the transmission component 1404. As further shown, the apparatus 1400 may include the communication manager 1408. The communication manager 1408 may control and/or otherwise manage one or more operations of the reception component 1402 and/or the transmission component 1404. In some aspects, the communication manager 1408 may include one or more antennas, a modem, a controller/processor, a memory, or a combination thereof, of the base station described in connection with FIG. 2. The communication manager 1408 may be, or be similar to, the communication manager 150 depicted in FIGS. 1 and 2. For example, in some aspects, the communication manager 1408 may be configured to perform one or more of the functions described as being performed by the communication manager 150. In some aspects, the communication manager 1408 may include the reception component 1402 and/or the transmission component 1404. The communication manager 1408 may include a selection component 1410, among other examples.

In some aspects, the apparatus 1400 may be configured to perform one or more operations described herein in connection with FIGS. 1-8. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network entity described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network entity described in connection with FIG. 2. In some aspects, the transmission component 1404 may be co-located with the reception component 1402 in a transceiver.

In some aspects, the selection component 1410 may select an SCS, according to a largest SCS rule, from among SCSs for active uplink BWPs for a CC, configured for a mobile station, that is enabled for multiple TRPs, based at least in part on at least two TAGs being configured for the CC and each TAG of the at least two TAGs being associated with multiple active uplink BWPs of multiple CCs. The reception component 1402 may receive a communication after accounting for a TA value, applied by the mobile station, that is indicated by a TA command associated with the SCS.

In some aspects, the selection component 1410 may select an SCS, according to a minimum SCS rule, from among SCSs for active uplink BWPs for a CC, configured for a mobile station, that is enabled for multiple TRPs, based at least in part on at least two TAGs being configured for the CC, each TAG of the at least two TAGs being associated with multiple active uplink BWPs of multiple CCs, and a communication to be transmitted being other than uplink data scheduled by an RAR uplink grant or feedback information for a successful RAR. The reception component 1402 may receive the communication after accounting for a TA value applied by the mobile station after a TA application time that is based at least in part on a time granularity that corresponds to the SCS.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a mobile station, comprising: selecting, by the mobile station, a subcarrier spacing (SCS), according to a largest SCS rule, from among SCSs for active uplink bandwidth parts (BWPs) for a component carrier (CC) that is enabled for multiple transmit receive points (TRPs) based at least in part on at least two timing advance groups (TAGs) being configured for the CC and each TAG of the at least two TAGs being associated with multiple active uplink BWPs of multiple CCs; and transmitting, by the mobile station, a communication after applying a TA command value that is indicated by a TA command associated with the SCS.

Aspect 2: The method of Aspect 1, wherein the largest SCS rule specifies that the mobile station is to select a largest SCS from among SCSs of the multiple active uplink BWPs associated with an indicated TAG.

Aspect 3: The method of Aspect 1, wherein the largest SCS rule specifies that the mobile station is to select a largest SCS from among SCSs of the multiple active uplink BWPs associated with the at least two TAGs.

Aspect 4: The method of any of Aspects 1-3, wherein the CC is enabled for multiple downlink control information for the multiple TRPs.

Aspect 5: A method of wireless communication performed by a network entity, comprising: selecting, by the network entity, a subcarrier spacing (SCS), according to a largest SCS rule, from among SCSs for active uplink bandwidth parts (BWPs) for a component carrier (CC), configured for a mobile station, that is enabled for multiple transmit receive points (TRPs) based at least in part on at least two timing advance groups (TAGs) being configured for the CC and each TAG of the at least two TAGs being associated with multiple active uplink BWPs of multiple CCs; and receiving, by the network entity, a communication after accounting for a TA value, applied by the mobile station, that is indicated by a TA command associated with the SCS.

Aspect 6: The method of Aspect 5, wherein the largest SCS rule specifies that the mobile station is to select a largest SCS from among SCSs of the multiple active uplink BWPs associated with an indicated TAG.

Aspect 7: The method of Aspect 5, wherein the largest SCS rule specifies that the mobile station is to select a largest SCS from among SCSs of the multiple active uplink BWPs associated with the at least two TAGs.

Aspect 8: A method of wireless communication performed by a mobile station, comprising: selecting, by the mobile station, a subcarrier spacing (SCS), according to a minimum SCS rule, from among SCSs for active uplink bandwidth parts (BWPs) for a component carrier (CC) that is enabled for multiple transmit receive points (TRPs) based at least in part on at least two timing advance groups (TAGs) being configured for the CC, each TAG of the at least two TAGs being associated with multiple active uplink BWPs of multiple CCs, and a communication to be transmitted; and transmitting, by the mobile station, the communication after applying a TA value after a TA application time that is based at least in part on the SCS.

Aspect 9: The method of Aspect 8, wherein the minimum SCS rule specifies that the mobile station is to select a minimum SCS from among SCSs of the multiple active uplink BWPs for all uplink CCs in an indicated TAG and from among SCSs of configured downlink BWPs for corresponding downlink CCs.

Aspect 10: The method of Aspect 8, wherein the minimum SCS rule specifies that the mobile station is to select a minimum SCS from among SCSs of the multiple active uplink BWPs for all uplink CCs in the at least two TAGs and from among SCSs of configured downlink BWPs for corresponding downlink CCs.

Aspect 11: The method of any of Aspects 8-10, wherein a TA command is received at a slot n, wherein applying the TA value includes applying the TA value for the communication at a slot n+k+1, and wherein k is based at least in part on a quantity of processing symbols in a slot, a quantity of slots in a subframe, and a maximum quantity of symbols for applying a TA value.

Aspect 12: The method of any of aspects Aspect 8-11, wherein the CC is enabled for multiple downlink control information for the multiple TRPs.

Aspect 13: A method of wireless communication performed by a network entity, comprising: selecting, by the network entity, a subcarrier spacing (SCS), according to a minimum SCS rule, from among SCSs for active uplink bandwidth parts (BWPs) for a component carrier (CC), configured for a mobile station, that is enabled for multiple transmit receive points (TRPs) based at least in part on at least two timing advance groups (TAGs) being configured for the CC, each TAG of the at least two TAGs being associated with multiple active uplink BWPs of multiple CCs; and receiving, by the network entity, a communication after accounting for a TA value applied by the mobile station after a TA application time that is based at least in part on the SCS.

Aspect 14: The method of Aspect 13, wherein the minimum SCS rule specifies that the mobile station is to select a minimum SCS from among SCSs of the multiple active uplink BWPs for all uplink CCs in an indicated TAG and from among SCSs of configured downlink BWPs for corresponding downlink CCs.

Aspect 15: The method of Aspect 13, wherein the minimum SCS rule specifies that the mobile station is to select a minimum SCS from among SCSs of the multiple active uplink BWPs for all uplink CCs in the at least two TAGs and from among SCSs of configured downlink BWPs for corresponding downlink CCs.

Aspect 16: The method of any of Aspects 13-15, wherein a TA command is expected to be received at a slot n, wherein accounting for the TA value comprises expecting the mobile station to apply the TA value for the communication at a slot n+k+1, and wherein k is based at least in part on a quantity of processing symbols in a slot, a quantity of slots in a subframe, and a maximum quantity of symbols for applying a TA value.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:

one or more memories; and one or more processors configured, based at least in part on information stored in the one or more memories, to:

select a subcarrier spacing (SCS), according to a largest SCS rule, from among SCSs for active uplink bandwidth parts (BWPs) for a component carrier (CC) that is enabled for multiple transmit receive points (TRPs), based at least in part on at least two timing advance groups (TAGs) being configured for the CC and each TAG of the at least two TAGs being associated with a multiple of active uplink BWPs of multiple CCs; and transmit a communication after applying a timing advance (TA) value that is indicated by a TA command associated with the SCS.

2. The mobile station of claim 1, wherein the largest SCS rule specifies that the mobile station is to select a largest SCS from among SCSs of the multiple of active uplink BWPs associated with an indicated TAG.

3. The mobile station of claim 1, wherein the largest SCS rule specifies that the mobile station is to select a largest SCS from among SCSs of the multiple of active uplink BWPs associated with the at least two TAGs.

4. The mobile station of claim 1, wherein the CC is enabled for multiple downlink control information for the multiple TRPs.

5. A network entity for wireless communication, comprising:

one or more memories; and one or more processors configured, based at least in part on information stored in the one or more memories, to:

select a subcarrier spacing (SCS), according to a largest SCS rule, from among SCSs for active uplink bandwidth parts (BWPs) for a component carrier (CC), configured for a mobile station, that is enabled for multiple transmit receive points (TRPs), based at least in part on at least two timing advance groups (TAGs) being configured for the CC and each TAG of the at least two TAGs being associated with a multiple of active uplink BWPs of multiple CCs; and receive a communication after accounting for a timing advance (TA) value, applied by the mobile station, that is indicated by a TA command associated with the SCS.

6. The network entity of claim 5, wherein the largest SCS rule specifies that the mobile station is to select a largest SCS from among SCSs of the multiple of active uplink BWPs associated with an indicated TAG.

7. The network entity of claim 5, wherein the largest SCS rule specifies that the mobile station is to select a largest SCS from among SCSs of the multiple of active uplink BWPs associated with the at least two TAGs.

8. A mobile station for wireless communication, comprising:

one or more memories; and one or more processors configured, based at least in part on information stored in the one or more memories, to:

select a subcarrier spacing (SCS), according to a minimum SCS rule, from among SCSs for active uplink bandwidth parts (BWPs) for a component carrier (CC) that is enabled for multiple transmit receive points (TRPs), based at least in part on at least two timing advance groups (TAGs) being configured for the CC, each TAG of the at least two TAGs being associated with a multiple of active uplink BWPs of multiple CCs, and a communication to be transmitted; and transmit the communication after applying a timing advance (TA) value after a TA application time that is based at least in part on the SCS.

9. The mobile station of claim 8, wherein the minimum SCS rule specifies that the mobile station is to select a minimum SCS from among SCSs of the multiple of active uplink BWPs for all uplink CCs in an indicated TAG and from among SCSs of configured downlink BWPs for corresponding downlink CCs.

10. The mobile station of claim 8, wherein the minimum SCS rule specifies that the mobile station is to select a minimum SCS from among SCSs of the multiple of active uplink BWPs for all uplink CCs in the at least two TAGs and from among SCSs of configured downlink BWPs for corresponding downlink CCs.

11. The mobile station of claim 8, wherein a TA command is received at a first slot, wherein applying the TA value after the TA application time comprises applying the TA value for the communication at another slot, the other slot based at least in part on a quantity of processing symbols in a slot, a quantity of slots in a subframe, and a maximum quantity of symbols for applying a TA value.

12. The mobile station of claim 8, wherein the CC is enabled for multiple downlink control information for the multiple TRPs.

13. A network entity for wireless communication, comprising:

one or more memories; and one or more processors configured, based at least in part on information stored in the one or more memories, to:

select a subcarrier spacing (SCS), according to a minimum SCS rule, from among SCSs for active uplink bandwidth parts (BWPs) for a component carrier (CC), configured for a mobile station, that is enabled for multiple transmit receive points (TRPs), based at least in part on at least two timing advance groups (TAGs) being configured for the CC, each TAG of the at least two TAGs being associated with a multiple of active uplink BWPs of multiple CCs; and receive a communication after accounting for a timing advance (TA) value applied by the mobile station after a TA application that is based at least in part on the SCS.

14. The network entity of claim 13, wherein the minimum SCS rule specifies that the mobile station is to select a minimum SCS from among SCSs of the multiple of active uplink BWPs for all uplink CCs in an indicated TAG and from among SCSs of configured downlink BWPs for corresponding downlink CCs.

15. The network entity of claim 13, wherein the minimum SCS rule specifies that the mobile station is to select a minimum SCS from among SCSs of the multiple of active uplink BWPs for all uplink CCs in the at least two TAGs and from among SCSs of configured downlink BWPs for corresponding downlink CCs.

16. The network entity of claim 13, wherein a TA command is expected to be received by the mobile station at a first slot, wherein accounting for the TA value comprises expecting the mobile station to apply the TA value for the communication at another slot, the other slot based at least in part on a quantity of processing symbols in a slot, a quantity of slots in a subframe, and a maximum quantity of symbols for applying a TA value.

* * * * *